United States Patent
Takahashi et al.

(10) Patent No.: US 6,527,364 B2
(45) Date of Patent: *Mar. 4, 2003

(54) INK JET RECORDING APPARATUS AND INK JET RECORDING METHOD

(75) Inventors: Kiichiro Takahashi, Kawasaki (JP); Naoji Otsuka, Yokohama (JP); Hitoshi Nishikori, Inagi (JP); Osamu Iwasaki, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/323,032

(22) Filed: Jun. 1, 1999

(65) Prior Publication Data

US 2002/0044170 A1 Apr. 18, 2002

(30) Foreign Application Priority Data

May 29, 1998 (JP) .......................... 10-149492

(51) Int. Cl.⁷ .......................... B41J 29/38; B41J 2/145; B41J 2/15
(52) U.S. Cl. .......................... 347/40; 347/16
(58) Field of Search .......................... 347/40, 104, 16; 358/298, 1.9

(56) References Cited

U.S. PATENT DOCUMENTS

| | | | |
|---|---|---|---|
| 4,313,124 A | 1/1982 | Hara | 347/57 |
| 4,345,262 A | 8/1982 | Shirato et al. | 347/10 |
| 4,459,600 A | 7/1984 | Sato et al. | 347/47 |
| 4,463,359 A | 7/1984 | Ayata et al. | 347/56 |
| 4,558,333 A | 12/1985 | Sugitani et al. | 347/65 |
| 4,723,129 A | 2/1988 | Endo et al. | 347/56 |
| 4,740,796 A | 4/1988 | Endo et al. | 347/56 |
| 5,604,520 A | 2/1997 | Matsubara et al. | 347/15 |
| 5,633,663 A * | 5/1997 | Matsubara et al. | 347/41 |
| 5,818,474 A | 10/1998 | Takahashi et al. | 347/15 |
| 5,852,454 A | 12/1998 | Kanematsu et al. | 347/43 |
| 5,975,678 A | 11/1999 | Kanematsu et al. | 347/43 |
| 6,164,756 A | 12/2000 | Takahashi et al. | 347/43 |

FOREIGN PATENT DOCUMENTS

| | | |
|---|---|---|
| EP | 0 518 670 A2 | 12/1992 |
| JP | 54-56847 | 5/1979 |
| JP | 59-123670 | 7/1984 |
| JP | 59-138461 | 8/1984 |
| JP | 60-71260 | 4/1985 |

* cited by examiner

Primary Examiner—Thinh Nguyen
(74) Attorney, Agent, or Firm—Fitzpatrick, Cella, Harper & Scinto

(57) ABSTRACT

An apparatus that includes a recording head having a plurality of recording elements arranged in a first direction is scanningly moved relative to a recording material in a second direction which is different from the first direction. The apparatus includes a motor driver for scanningly moving the recording head to the recording material in the second direction and a CPU/MPU for controlling driving of the recording head such that while scanningly moving the recording head in the second direction, the recording is effected such that a recording band region which extends into a second region and which is recorded using part of a continuous recording element and a non-recording band region which is not recorded, appears alternately, and by a different scanning movement, the non-recording band region is recorded. The recording band region and the non-recording band region have the same size.

12 Claims, 27 Drawing Sheets

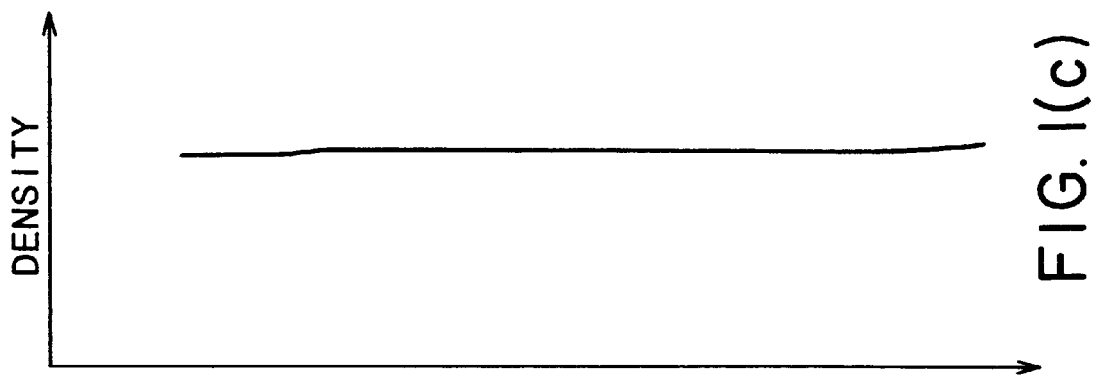
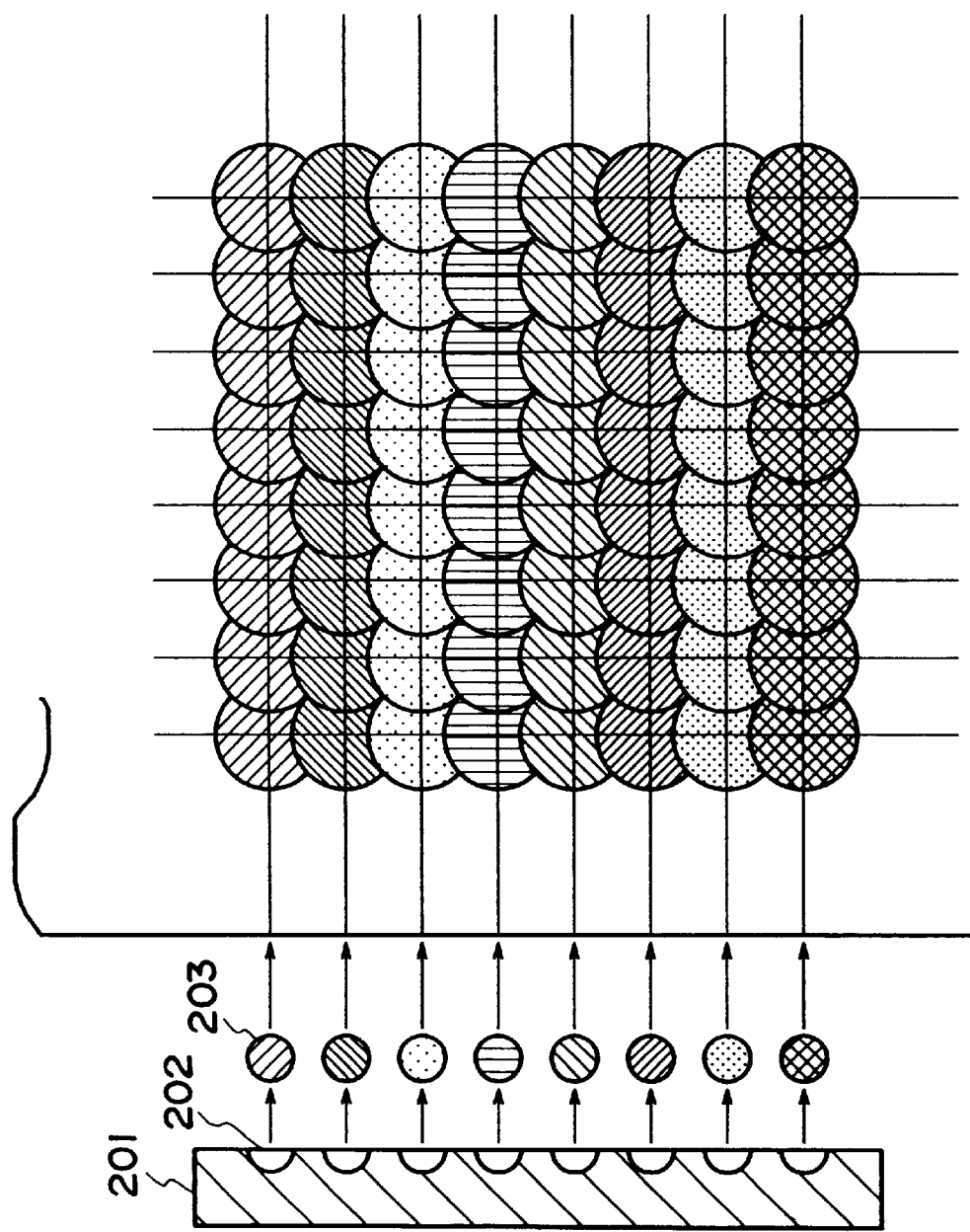

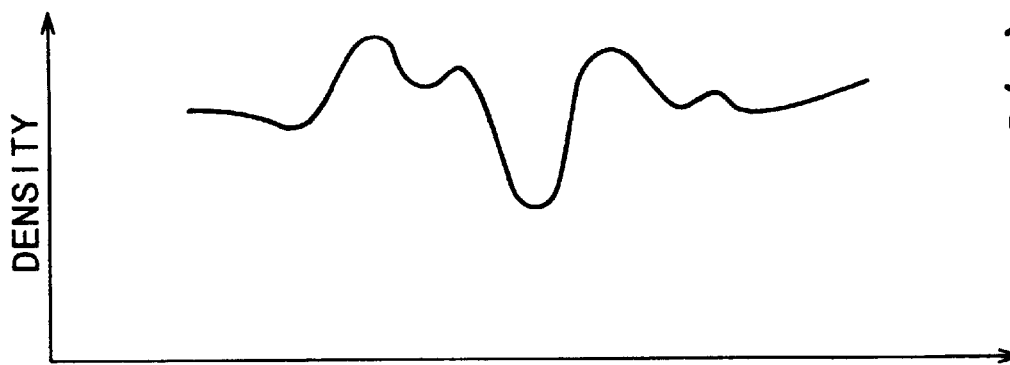
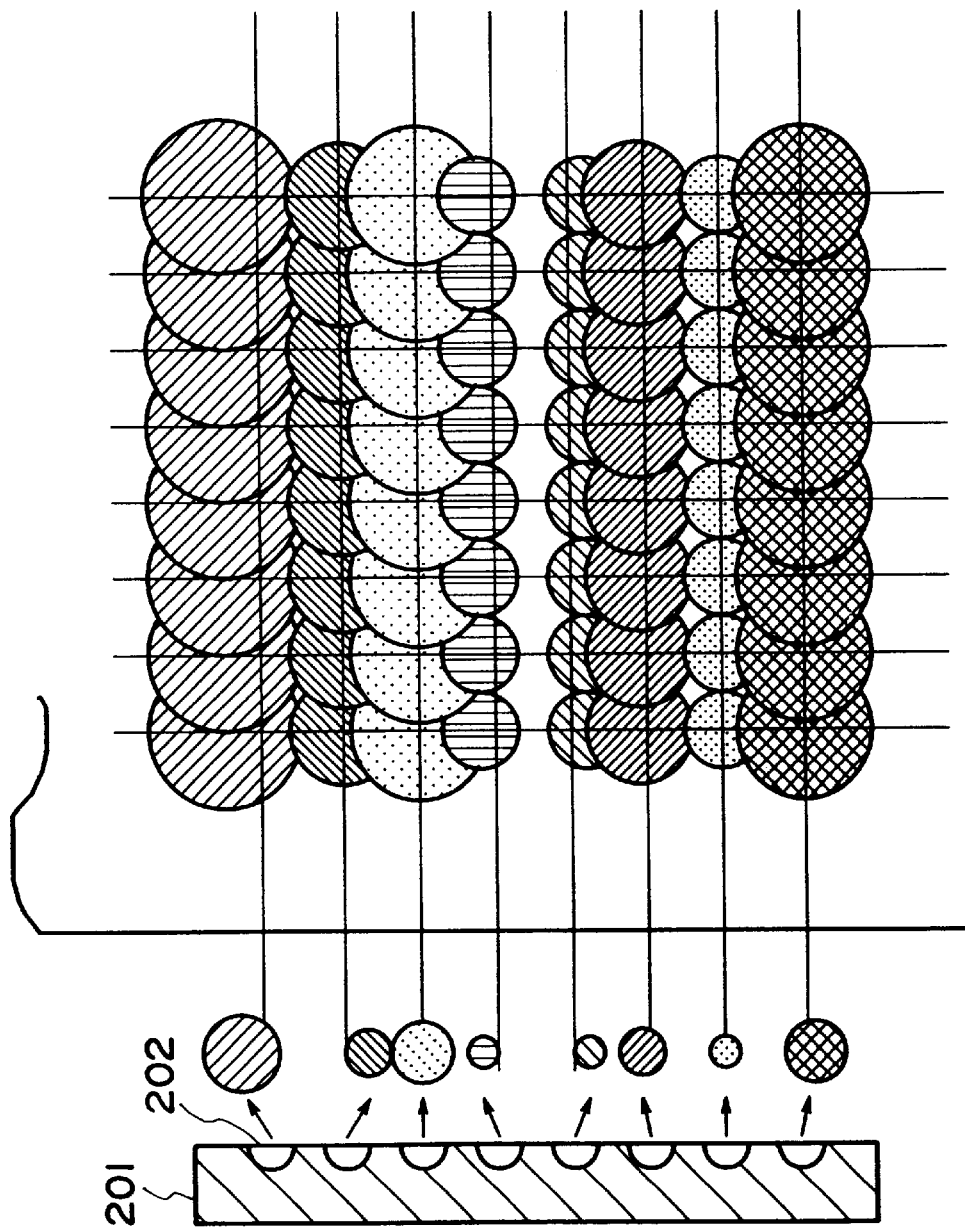
FIG. 2(c)
FIG. 2(b)
FIG. 2(a)

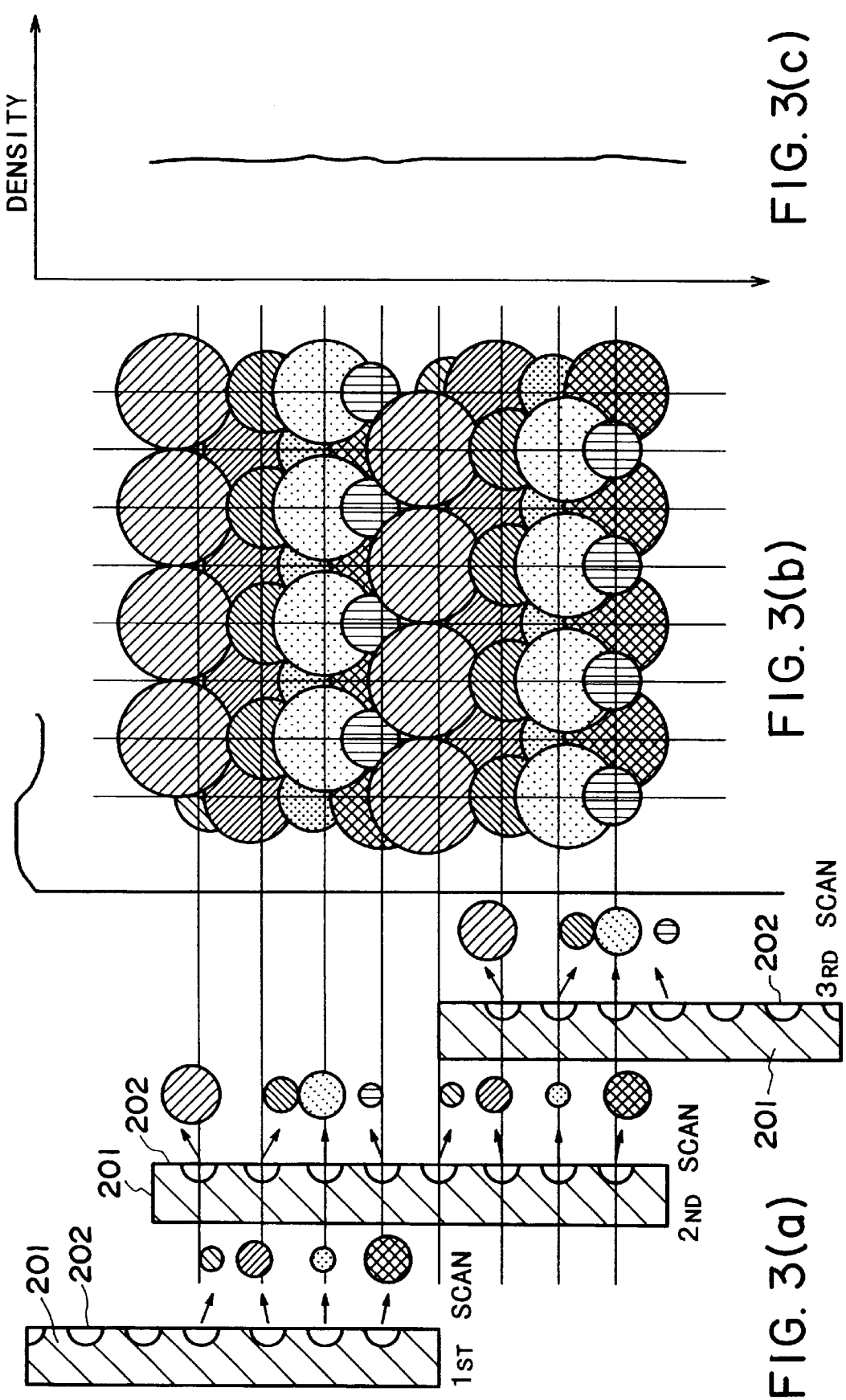

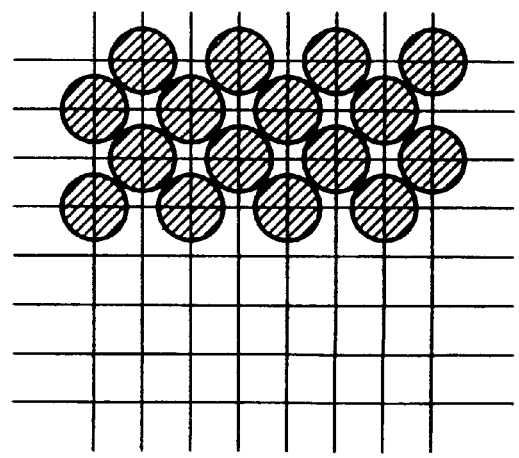
FIG. 4(a)
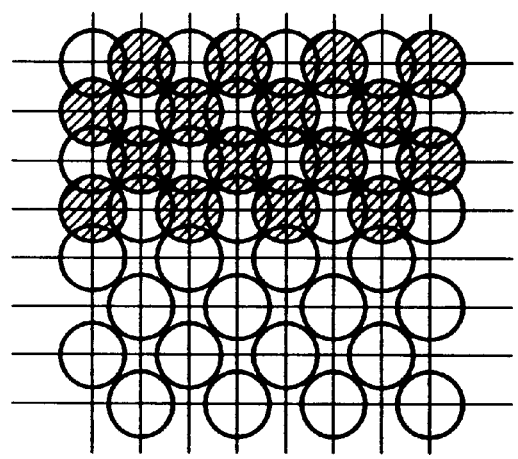
FIG. 4(b)
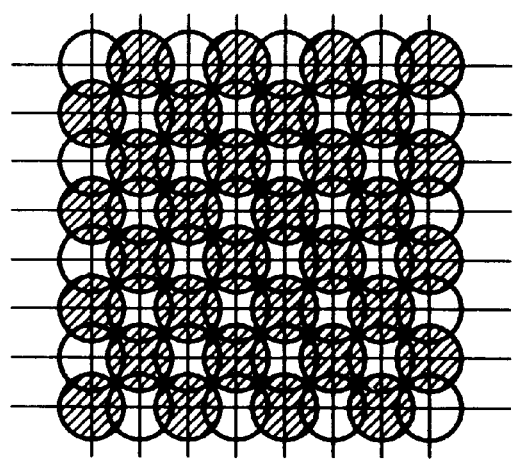
FIG. 4(c)
 STAGGERED
 REVERSE STAGGERED

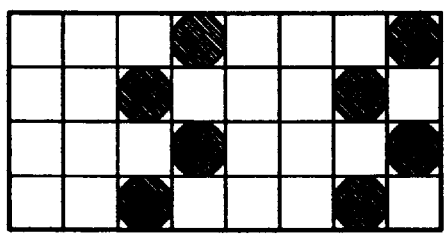
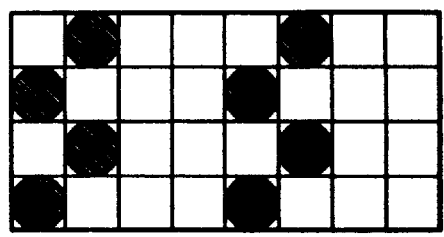
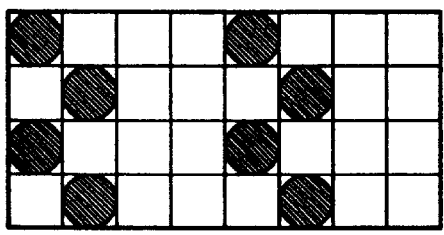
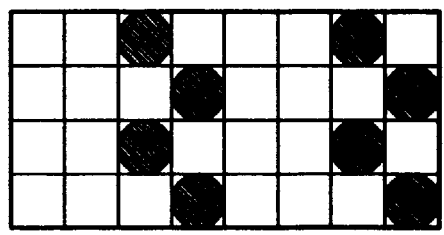
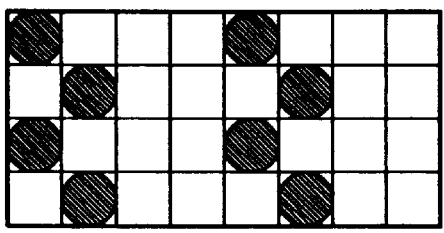
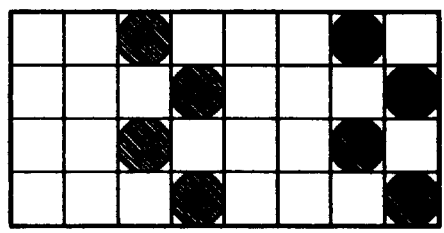
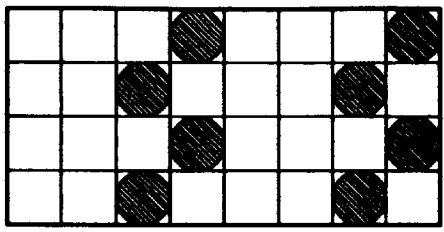
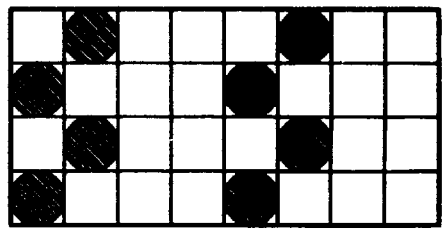
FIG. 22

INK JET RECORDING APPARATUS AND INK JET RECORDING METHOD

FIELD OF THE INVENTION AND RELATED ART

The present invention relates to a multi-scan recording method and a high speed recording apparatus, which can be used in combination to record at a high speed and a high level of quality, without the problems which occur when a conventional multi-scan recording method is used in combination with a high speed recording apparatus.

In recent years, various office automation business machines such as personal computers or word processors have come to be widely used, along with various recording apparatuses for printing out the data inputted with the use of these machines. Also, the technologies for printing high quality images at a high speed with the use of these machines have been rapidly developed.

First, these technologies will be briefly described.
(1) Technologies for Improving Image Quality One of the technologies for improving image quality is a multiple scanning recording.

When an image is recorded with the use of a recording head comprising a plurality of recording elements, the quality of an image to be recorded greatly depends on the performance of the recording head itself. Slight differences in shape among the ejection orifices of a recording head or electrothermal transducers (ejection heaters), which occur during the recording head manufacturing process, affect the amount by which ink is ejected from each ejection orifice, or the direction in which ink is ejected from each ejection orifice. In other words, the presence of these differences manifest as nonuniform density in a final image, reducing the image quality.

An example of such manifestation of nonuniform density will be described with reference to FIGS. 1 and 2. In FIG. 1, (a), a referential character 201 designates a recording head. For the sake of more simple description, it is assumed that the recording head 201 comprises eight nozzles 202. A referential character 203 designates an ink droplet ejected by a nozzle 202. Ideally, all ink droplets are the same in terms of the amount (normal amount) by which they are ejected, and also in terms of the direction in which they are ejected as illustrated in FIG. 1, (a). When ink is ejected as illustrated in FIG. 1, (a), all the dots formed on a piece of recording sheet as the ink droplets land on the recording sheet will be uniform in size as illustrated in FIG. 1, (b). Therefore, an image which does not suffer from nonuniform density, as illustrated in FIG. 1, (c), is formed.

In reality, however, each nozzle 202 of the recording head 201 is different in ejection characteristic from the other. Therefore, if an image is recorded as described above, the ink droplet ejected from each nozzle becomes different in size and direction from those ejected from the other nozzles as illustrated in FIG. 2, (a). As a result, a pattern such as the one illustrated in FIG. 2, (b) is created on a piece of recording sheet as the ink droplets land on the recording sheet. In other words, as is evident from FIG. 2, (b), white spots are visible, which are created when the area factor fails to reach 100%, that is, when a unit strip of recording field fails to be 100% covered with the ink. These white spots align in the primary scanning direction of the recording head. Also, there are spots where the dots excessively overlap, and/or white strips like the white strip at the center of FIG. 2, (b). In other words, the recording density distribution of the image created as ink droplets different in size and direction land on the recording sheet becomes as illustrated in FIG. 2, (c), being nonuniform in terms of the direction in which the nozzles are aligned. This nonuniform density distribution is sensed as an anomaly by a person with normal eyesight.

Thus, the following method has been devised as a measure for dealing with such a problem, which will be described with reference to FIGS. 3 and 4. Referring to FIG. 3, according to this method, in order to complete an image area illustrated in FIGS. 1 and 2, the recording head 201 was run three times. The top half of the image area, which amounts to one half of the image area, and corresponds to a unit of four picture elements, is completed through two runs of the recording head 201. More specifically, the eight nozzles of the recording head 201 are divided into top and bottom groups, which comprises the top four nozzles and the bottom four nozzles, respectively. The number of dots placed per scan, or recording run, by a single nozzle is half the number of the dots, which will be placed in accordance with a full set of image formation data correspondent to a single raster when a conventional multi-scan recording method is employed; in other words, the dot density is thinned to a half, according to a predetermined image data arrangement. During the second run, dots are filled into the spots correspondent to the remaining half of the image formation data, to complete the aforementioned strip of recording field correspondent to a unit of four recording elements. This recording method is called the "multi-scan recording method".

With the use of this recording method, the effects of the difference in size and direction among the nozzles of a recording head is halved even when a recording head such as the one illustrated in FIG. 2 is used. Therefore, an image area such as the one illustrated in FIG. 3, (b) is created, in which the black or white strips illustrated in FIG. 2, (b) are less obtrusive, and which has a recording density distribution illustrated in FIG. 3, (c); anomaly in density is substantially small.

Also in this recording method, a set of image formation data is divided according to a predetermined arrangement (mask), into two sub-sets, which compensate for each other. One of the most commonly used image formation data arrangement patterns (dot density thinning pattern) is a pattern which produces the dot placement pattern illustrated in FIGS. 4, (a)–(c), in which the dot density is thinned by eliminating every other dot in terms of both the vertical and horizontal directions so that the remaining dots are staggered relative to the dots in the adjacent lines. A unit strip of recording field (recorded here by a unit of four recording elements) is recorded by two recording runs: the first run which places dots in the staggered pattern illustrated in FIG. 4, (a), and the second run which places dots in the staggered pattern illustrated in FIG. 4, (b). The second staggered pattern is the reversal of the first staggered pattern.

In most cases, the distance recording medium is advanced in the secondary scanning direction, per recording run, is set to be constant. In the case illustrated in FIGS. 3 and 4, recording medium was advanced by a distance equivalent to four nozzles, per recording run.
(2) High Speed Recording Technology As one example of technology for increasing recording speed, it is possible to increase the number of nozzles. In the case of the serial recording method in which a unit strip of recording field is recorded through a single recording run in which all the nozzles of a recording head are activated, recording speed increases as the number of nozzles is increased, although the increase in recording speed is not exactly proportional to the increase in the number of nozzle because of the time used for feeding or discharging a plurality of recording sheets, or the like operations. For example, if a recording head with 64 nozzles is set to record at a resolution of 360 dpi, the recording of a piece of recording medium with a size of A4 can be completed by approximately 60 recording runs. However, if a recording head with 256 nozzles is set to record at the same resolution, the recording of the same medium can be completed by approximately 15 recording runs; in other words, recording speed increases to a speed four times the speed of the first head.

In the case of the first head, the length of the nozzle alignment is approximately 4.52 mm (=25.4 mm/360 dpi×64 nozzles), whereas in the case of the second head, it is 18.06 mm (25.4 mm/360 dpi×250 nozzles), being approximately four times that of the first head.

At this time, formation of an illusionary line will be described. It is assumed that the state of ink ejection from a recording head, and the landing position of each ink droplet, and the like factors, are ideal.

In the case of an ink jet recording system, a dot is often placed so that it overlaps with a priorly formed dot. In the area where the two dots overlap, the ink of the second dot, or the dot placed later, tends to penetrate deeper into the recording medium than the ink of the dot placed first.

FIG. 5 is a schematic sectional view of a piece of recording medium P, and two ink droplets; the first ink droplet, and the second ink droplet ejected following the first. It sequentially depicts how the two ink droplets behave after hitting the recording medium. As the ink comes in contact with the recording medium P, coloring component, such as dye, in the ink combines with the recording medium P, physically as well as chemically. However, since there is a limit to the amount by which coloring component can combine with the recording medium P, the combination of the coloring component in the first ink droplet and the recording medium P takes precedence in terms of bonding strength unless there is a substantial difference in bonding strength between the coloring components in the first and second ink droplets. Therefore, it is relatively difficult for the coloring component in the second ink droplet to combine with the portion of the recording medium P close to the recording surface. As a result, the coloring component in the second ink droplet penetrates deeper into the recording medium P, coloring the deeper portion of the recording medium P. Further, taking into consideration the ink behavior at the level of the fiber in the recording medium P, a piece of fiber having once bonded with the dye or the like in the ink is stronger in terms of hydrophilicity than the one having never bonded with the dye. Therefore, there is a tendency that if an ink droplet lands adjacent to the portion of the recording medium P stronger in hydrophilicity, the ink from the ink droplet is drawn toward the portion of the recording medium P where the preceding ink droplet landed.

This results in the following problems. Referring to FIG. 6, as recording is made immediately adjacent to the area in which recording has been completed, ink droplets land at the border between the recorded and unrecorded areas, and the ink of the ink droplets is drawn into the priorly recorded area. As a result, the portions of the priorly recorded area immediately adjacent to this border are supplied with an additional amount of ink, increasing in coloring component density When this phenomenon occurs to a limited number of the portions along the border, these portions do not stand out. However, when these portions with a higher color component density align in the raster direction, the aligned portions are perceived as a single line, or "illusionary line".

When a technology is considered for improving image quality, along with a technology for increasing recording speed, the illusionary line between two adjacent unit strips of recording field is regarded as a problem.

For example, where recording of a unit strip of recording field is completed through four recording runs by a recording head with 64 nozzles aligned to record at a recording resolution of 360 dpi, the width of each unit strip of recording field in the recording medium advancement direction is approximately 1.13 mm (16 nozzles×25.4 mm/360 dpi), whereas where each unit strip of recording field is completed through four recording runs, the width of each unit strip of recording field is approximately 4.52 mm (64 nozzles×25.4 mm/360 dpi). Therefore, an illusionary line in the second case is easier for human vision to detect; the illusionary line is one of the problems which occur as an attempt is made to improve image quality.

The smaller the interval, the less visible are the illusionary lines. Therefore, in order to make illusionary lines less visible while using a conventional multi-scan recording method, it is possible to increase the number of recording runs used to complete a unit stripe of recording field so that the width of each sub-strip in a unit strip of recording field becomes smaller. However, simply increasing the number of recording runs reduces recording speed, despite the substantial number of nozzles added to increase recording speed. In other words, with the use of a conventional multi-scan recording method, it is impossible to increase both image quality and recording speed of the same time.

SUMMARY OF THE INVENTION

Thus, the present invention was made by addressing the ink draw, which is the essential cause of the illusionary line, and its object is to prevent the ink draw itself, or to reduce the magnitude of the aforementioned problem, or the illusionary line, by controlling the interval of the illusionary lines. In other words, the primary object of the present invention is to provide a recording method and a recording apparatus, which can be used in combination to make the illusionary line, which occurs at the border of two adjacent sub-strips in each unit strip of recording field, hard to recognize by reducing the interval of the illusionary lines, and also to effectively utilize the characteristic of a conventional multi-scan recording method so that the ink draw, which is the essential cause of the appearance of the illusionary lines, can be controlled within each unit strip of recording field.

The present invention which accomplishes the above described object is embodied as an ink jet recording apparatus comprising: a recording head, which has a plurality of recording elements aligned in the first direction, that is, the direction perpendicular to the raster direction, and is moved relative to recording medium in the second direction different from the first direction to record on the recording medium; a recording head moving means, which moves the recording head relative to the recording medium in the aforementioned second direction; and a recording head controlling means which controls the movement of the recording head. It is characterized by the following features. That is, the plurality of recording elements of the recording head are grouped into a plurality of sets comprising consecutively placed recording elements. In a recording operation, the recording head is moved relative to the recording medium in the second direction while being moved relative to the recording medium in the first direction after each movement in the second direction. During the first recording run of the recording head loin the second direction, a plurality of recorded strips of recording field, which are separated from the adjacent recorded strips by an unrecorded strip of recording field are produced, and during the immediately following recording run, recording is made across the plurality of unrecorded strips of recording field.

Further, the present invention is also embodied as an ink jet recording method in which a recording head comprising a plurality of recording elements aligned in the first direction, that is, the direction perpendicular to the raster direction, and which records an image by moving the recording head relative to recording medium in the second direction different from the first direction. It is characterized by the following features. That is, in a recording operation, the recording head is moved relative to the recording medium in the second direction while being moved relative to the recording medium in the first direction after each movement in the second direction. During the first recording run of the recording head in the second direction, a plurality of recorded strips of recording field, which are separated from the adjacent recorded strips by an unrecorded strip of recording field, and during the immediately following recording run, recording is made across the plurality of unrecorded strips of recording field.

The present invention is also embodied as an ink jet recording apparatus comprises: a recording head, which has a plurality of recording elements aligned in the first direction, that is, the direction perpendicular to the raster direction, and is moved relative to recording medium in the second direction different from the first direction to record on the recording medium; a means for dividing each unit strip of recording field correspondent to a predetermined number of rasters, into a plurality of sub-strips which extends in the raster direction; a mask selecting means which selects a dot density thinning mask for each sub-strip; a recording controlling means which records across each unit strip of recording field through a plurality of recording runs, each of which is made corresponding to different sub-strips while using a dot density thinning mask different from the masks used for the other runs. It is characterized by the following features. That is, in a recording operation by this recording apparatus, a unit strip of recording field, which can be recorded through a single recording run by the recording head in the second direction different from the first direction, if all the recording elements are activated, is recorded through a plurality of recording runs, each of which is made with the use of a dot density thinning mask different from the dot density thinning mask for the other runs, is recorded so that recording of each sub-strip of recording field extending in the second direction, that is, the raster direction, is completed through two recording runs, each of which uses a set of recording elements different from the set of recording elements used for other runs, and that the controlling means controls the recording head so that a set of a plurality of alternately selected sub-strips of recording field is recorded through the same recording run.

Further, the present invention can provide an ink jet recording method, which is usable with a recording head which comprises a recording head, comprising a plurality of recording elements aligned in the first direction, that is, the direction perpendicular to the raster direction, and is moved relative to recording medium in the second direction different from the first direction to record on the recording medium; and comprises: a step in which a unit strip of recording field is divided into a plurality of sub-strips, each of which extends in the raster direction, and corresponds to a plurality of rasters; a process in which a dot density thinning mask is selected for each sub-strip of recording field; and a process in which each sub-strip of recording field is recorded through a plurality of recording runs made while using a dot density thinning mask. This method is characterized by the following features. That is, in a recording operation, a set of nonadjacent sub-strips of recording field are recorded through the same recording run in the second direction.

According to the above described structure, the interval of the "illusionary line" created between two adjacent sub-strips of recording field as the recording of each sub-strip is completed, can be made smaller by reducing the number of rasters necessary to complete the recording of each sub-strip. Further, regarding each sub-strip of recording field, there are the same effects as those produced by a conventional multi-scan recording method. That is, since a unit strip of recording field is recorded with the use of a plurality of sets of nozzles different from the nozzles in the other sets, it is possible to prevent inaccuracy in the ejection direction of each nozzle from negatively affecting image quality. Further, recording is made in such a manner that after a sub-strip of recording field is completed, the recording of a sub-strip of recording field adjacent to the completed sub-strip is started, the magnitude of the ink draw which is the essential cause of the "illusionary lines" is smaller. In this specification of the present invention, a word "raster" means a strip of recording field, the recording of which can be completed by moving a single recording element (nozzle) in the main scanning direction while ejecting ink.

While the invention has been described with reference to the structures disclosed herein, it is not confined to the details set forth and this application is intended to cover such modifications or changes as may come within the purposes of the improvements or the scope of the following claims.

BRIEF DESCRIPTION OF THE DRAWINGS

FIG. 1 is a schematic drawing which shows an example of the ideal state of a recording by an ink jet recording apparatus.

FIG. 2 is a schematic drawing which shows an example of a state of a recording by an ink jet recording apparatus, affected by nonuniform density.

FIG. 3 is a schematic drawing which depicts the state of a recording with an example of a conventional multi-scan recording method, being affected by nonuniform density of a reduced level.

FIG. 4 is a drawing which depicts a typical pattern in which dots are distributed by a typical multi-scan recording method.

FIG. 22 is a schematic drawing which shows examples of a dot density thinning mask employed by the multi-scan recording method in the second embodiment.

DESCRIPTION OF THE PREFERRED EMBODIMENTS

Hereinafter, the embodiments of the present invention in the form of an ink jet recording apparatus will be described in detail with reference to the appended drawings.

FIGS. 7–12 depict an ink jet head IJH, an ink container IT, an ink Jet cartridge IJC, an ink jet recording apparatus main assembly IJRA, and a carriage HC, which are desirable for the application of the present invention, and also their relationship. First, the structure of each component will be described with reference to these drawings.

(i) Description of General Structure of Apparatus Main Assembly

Figure 5:
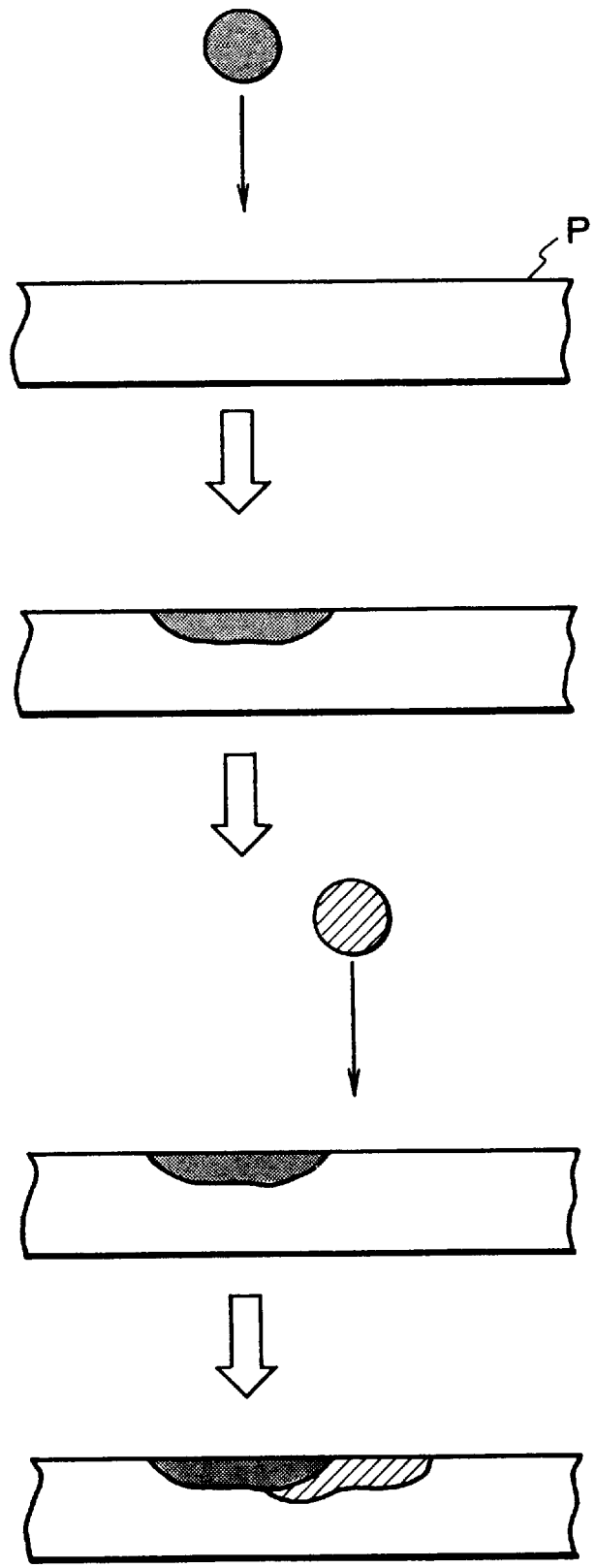
FIG. 5 is a sectional view of a piece of recording sheet, and two ink droplets ejected in succession, and depicts how the inks from two droplets penetrate into the recording sheet after landing on the recording sheet.
Figure 6:
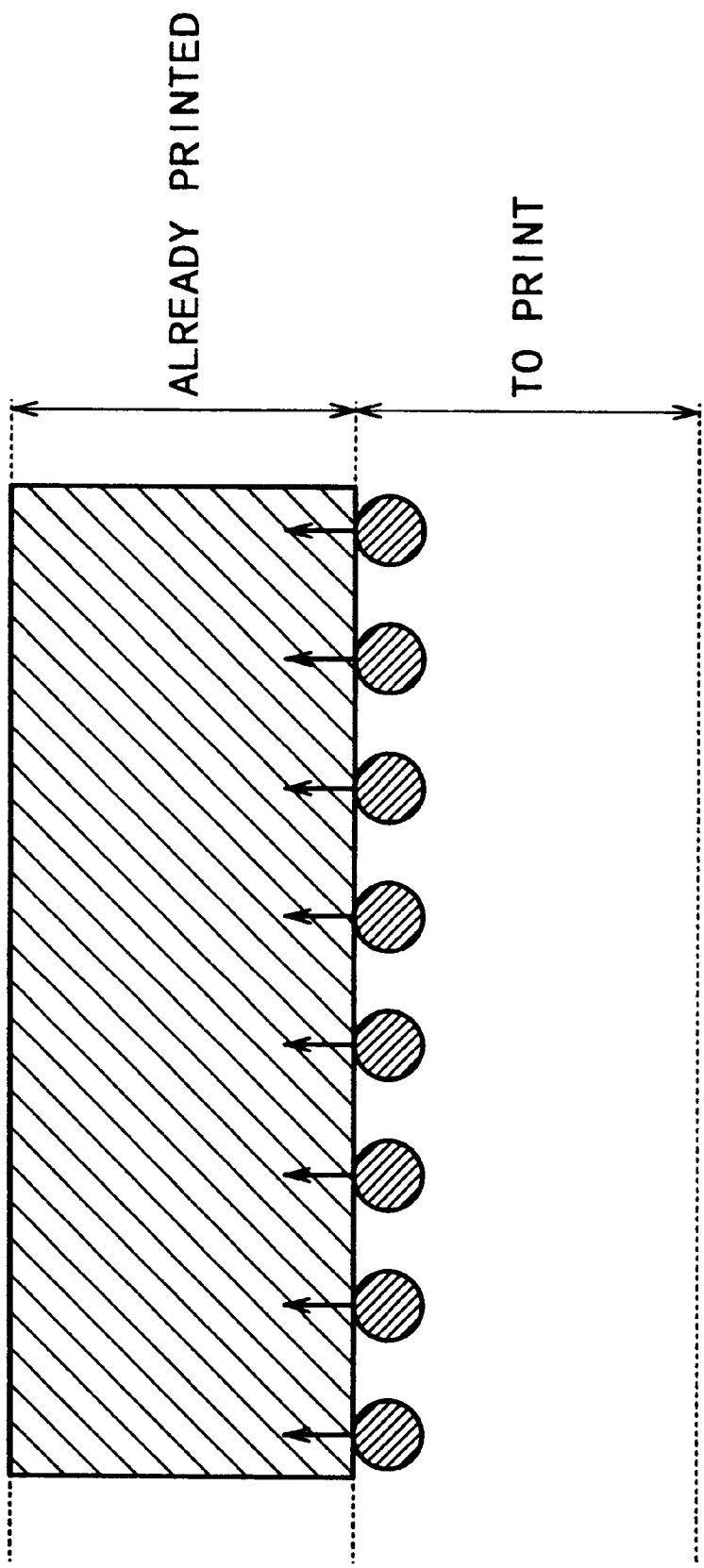
FIG. 6 is a schematic drawing which depicts the origin of an illusionary line at the borderline between two adjacent strips of recording field.
Figure 7:
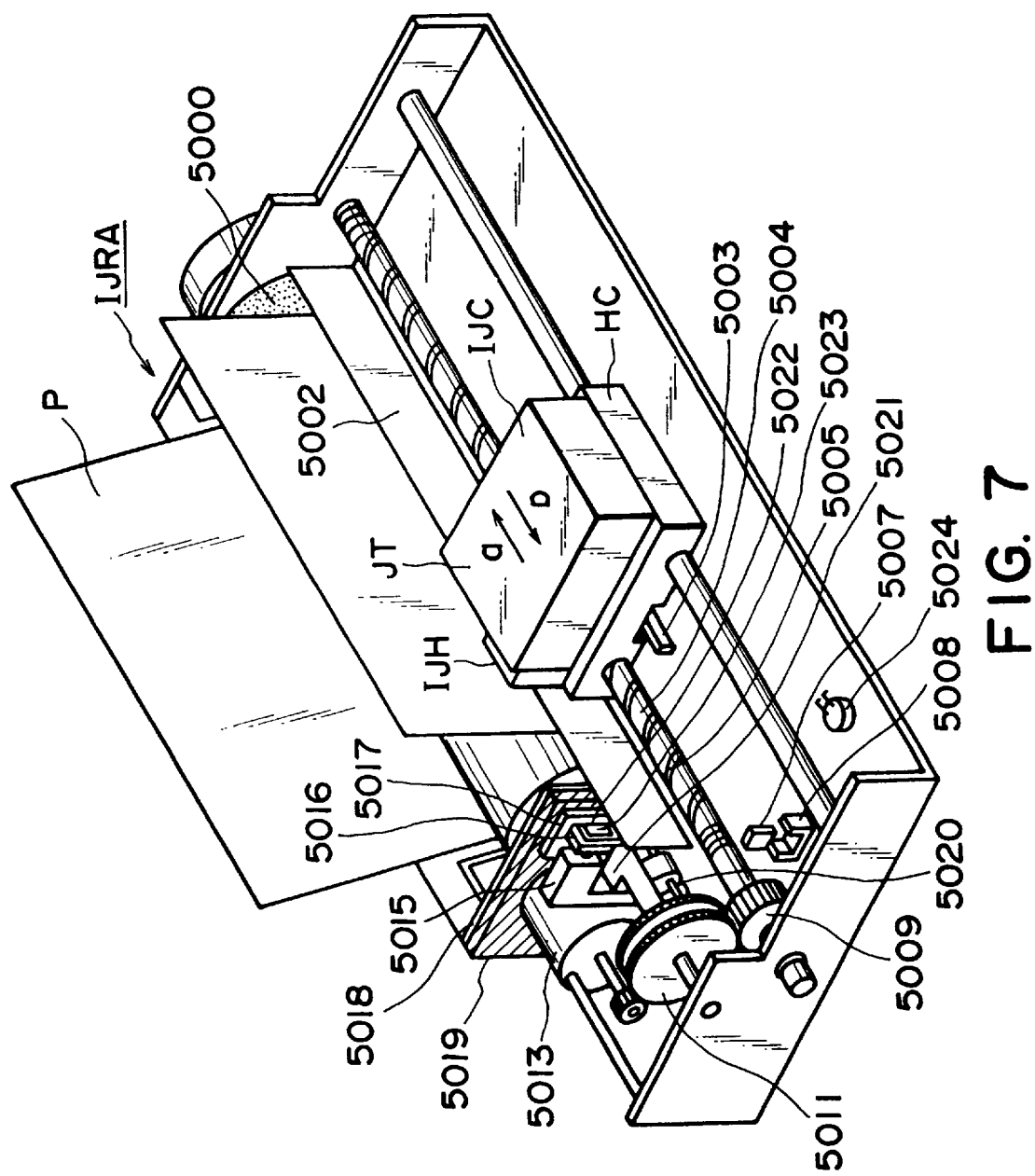
FIG. 7 is a perspective view of the main assembly of an ink jet recording apparatus to which the present invention is applicable.

FIG. 7 is a schematic perspective view of an example of a ink jet recording apparatus IJRA to which the present invention is applicable. In FIG. 7, a carriage HC is provided with a pin (unillustrated), which engages in a spiral groove 5005 of a lead screw 5005. The lead screw 5005 is connected to a driving motor 5013 through driving force transmission gears 5011 and 5009. As the driving motor 5013 rotates forward or backward, the carriage HC is moved in the direction a or b, respectively. On this carriage HC, an ink jet cartridge IJC is mounted. A referential character 5002 designates a sheet pressing plate, which extends across the entire shuttling range of the carriage HC, and presses a recording sheet upon a platen 500. Referential characters 5007 and 5008 designate an essential pair of components of a home position detecting means for switching the rotational direction of the motor 5013 or carrying out the like operations. A referential character 5016 designates a member for supporting a cap 5022 for covering the front surface of a recording head A referential character 5015 designates an ink sucking means which sucks the ink through its opening 5023 to restore the recording head performance. A referential character 5017 designates a cleaning blade. A referential character 5019 designates a member which enables the cleaning blade 5017 to move back and forth. These components are supported by a main structure supporting board 5018.

Designated by a referential character 5024 is a temperature-humidity sensor which detects the ambient temperature or humidity of the ink jet recording apparatus. The temperature-humidity sensor 5024 also makes it possible to predict the temperature of the ink jet recording head. The temperature-humidity sensor 5024 may be attached to the ink jet cartridge IJC, or may be directly attached to the ink jet head IJH.

A referential character 5021 designates a lever for initiating the suction for restoring the recording head performance. The lever 5021 moves as a cam 5020 engaged with the carriage moves; the movement of the lever 5021 is controlled by a well-known transmitting means such as a clutch which transmits the driving force from the driving motor.

The cap, cleaning blade, and sucking means are structured so that they are activated to cap, clean, and suck, respectively, when the carriage is positioned at the home position by the rotation of the lead screw 5004. However, any configuration may be employed as long as it enables these components to carry out their functions with proper timing.

As is evident from FIG. 7, or the perspective view of the ink jet cartridge IJC in this embodiment, the ink jet head IJH slightly projects beyond the front surface of the ink container IT, increasing the ink capacity of the ink jet cartridge IJC. This ink jet carriage IJC is removably mountable on the carriage HC. As the ink jet cartridge IJC is mounted on the carriage HC, it is firmly held by the positioning means and electrical contact points, with which the carriage HC of the main assembly of the ink jet recording apparatus is provided. The positioning means and electrical contact points of the carriage HC will be described later.

(ii) Description of Ink Jet Head Structure

The ink jet head IJH is recording head comprising electrothermal transducers which generate thermal energy for triggering the "film-boiling" of ink in response to electric signals.

(iii) Description of Heater Board

Figure 8:
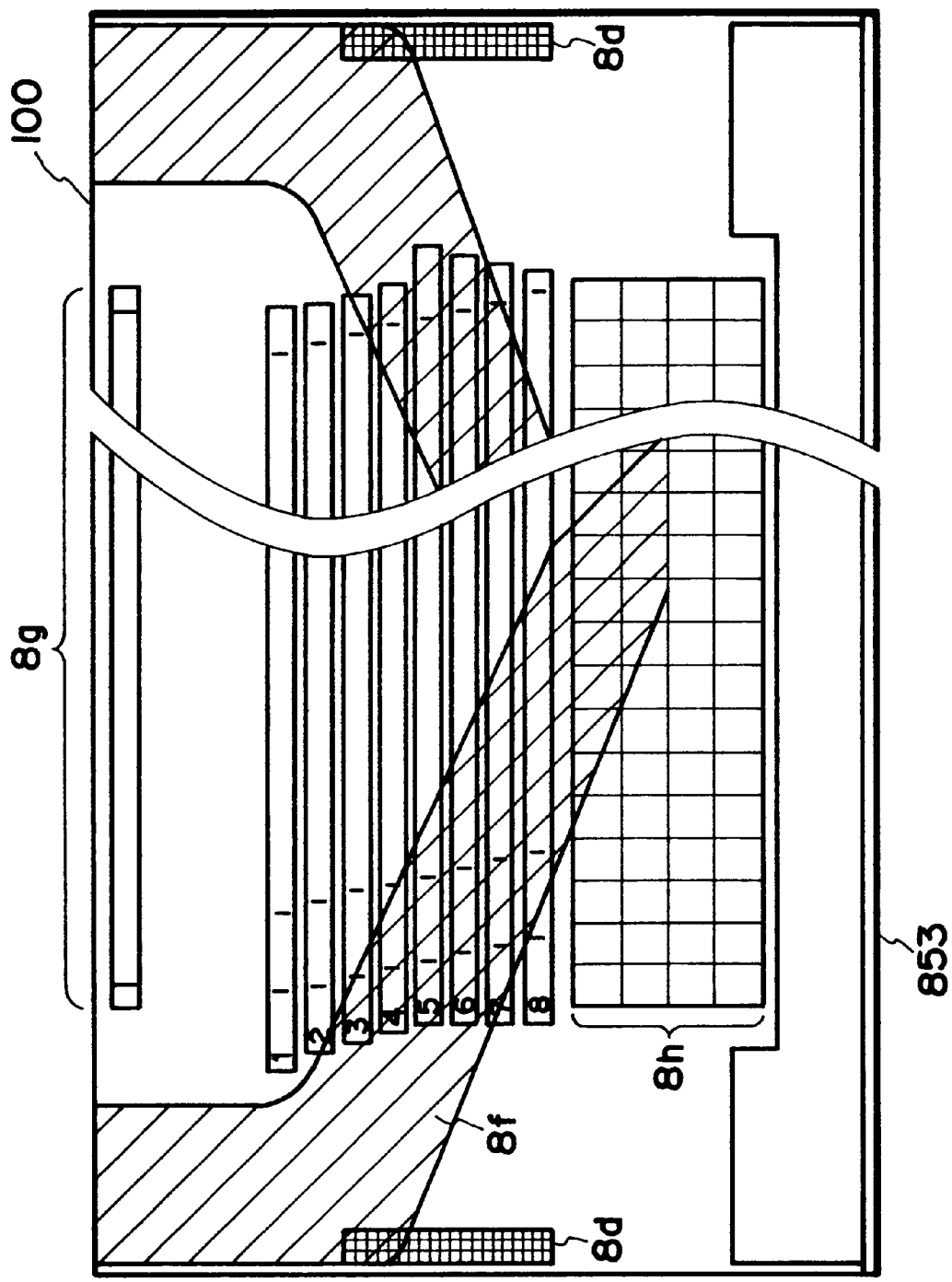
FIG. 8 is a schematic plan view of a heater board which constitutes the essential part of a recording head employed in the recording apparatus illustrated in FIG. 7.

FIG. 8 is a schematic view of a heater board 100 in the recording head in this embodiment. There are a heater 8d (sub-heater), an ejection row 8g, and a driver element 8h, on the single piece of substance. The heater 8d controls the head temperature, and the ejection row 8g comprises a plurality of heaters (main heaters) for ejecting ink. Their positional relationship is as depicted by FIG. 8. Positioning these functional elements on a single piece of substrate improves the efficiency with which the head temperature is detected and the head is controlled, and further, it makes It possible to reduce the head size while simplifying the heat manufacturing process. Also depicted in the same drawing, by hatching, is the position of peripheral wall 8d of the top plate, which separates the heater board into two regions, that is, the region which will be filled with ink, and the region which will be not filled with ink, relative to the heater board 100. The space on the ejection row 8g side of the peripheral wall 8f functions as a common liquid chamber. The liquid paths are constituted of the grooves formed in the ejection row 8g portion, above the peripheral wall 8d.

(iv) Description of Control System Structure

Next, the structure of the system for controlling the aforementioned various members of the ink jet recording apparatus will be described with reference to FIG. 9, or a block diagram, which depicts the control system of the apparatus. In the drawing, a referential character 10 designates an interface through which recording signals are inputted; 11, an MPU which is a computing apparatus; 12, a program ROM for storing control programs which the CPU 11 carries out; and a referential character 13 designates a dynamic RAM for storing various data (aforementioned recording signals, recording data supplied to head, or the like), which is capable of storing the printing dot count, the ink recording head exchange count, or the like. A referential character 14 designates a gate array which controls the recording data as the data are supplied to the recording head 18, and also controls the transfer of the data among the interface 10, MFU 11, and RAM 13. A referential character 20 designates a carrier motor for driving the carriage which carries the recording head 18, and a referential character 19 designates a conveyer motor for recording sheet conveyance. A referential character 15 designates a head driver which drives the recording head 18, and referential characters 16 and 17 designate motor drivers which drive the conveyer motor 19 and carrier motor 20, respectively.

Figure 9:
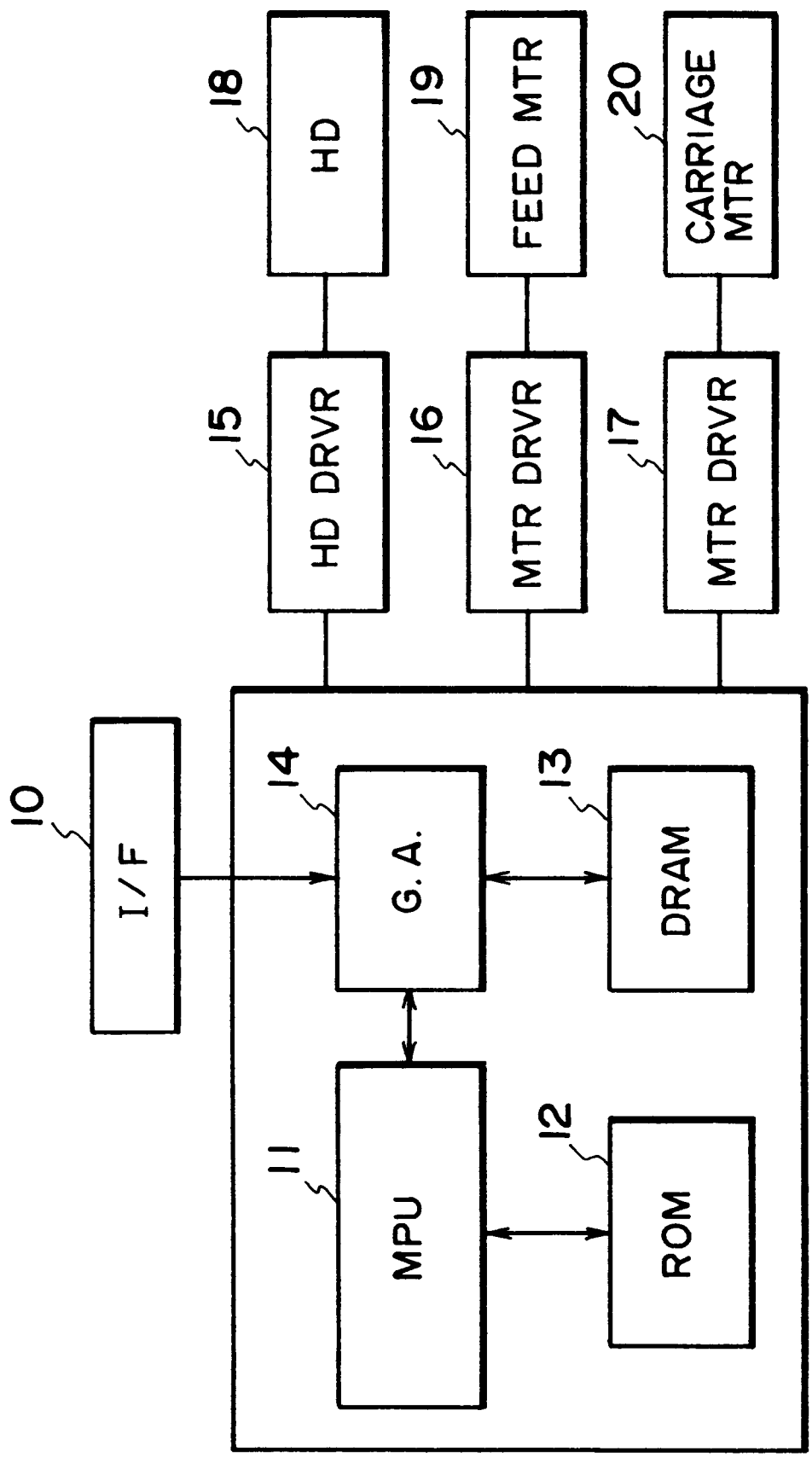
FIG. 9 is a block diagram of the control circuit of the recording apparatus illustrated in FIG. 7.
Figure 10:
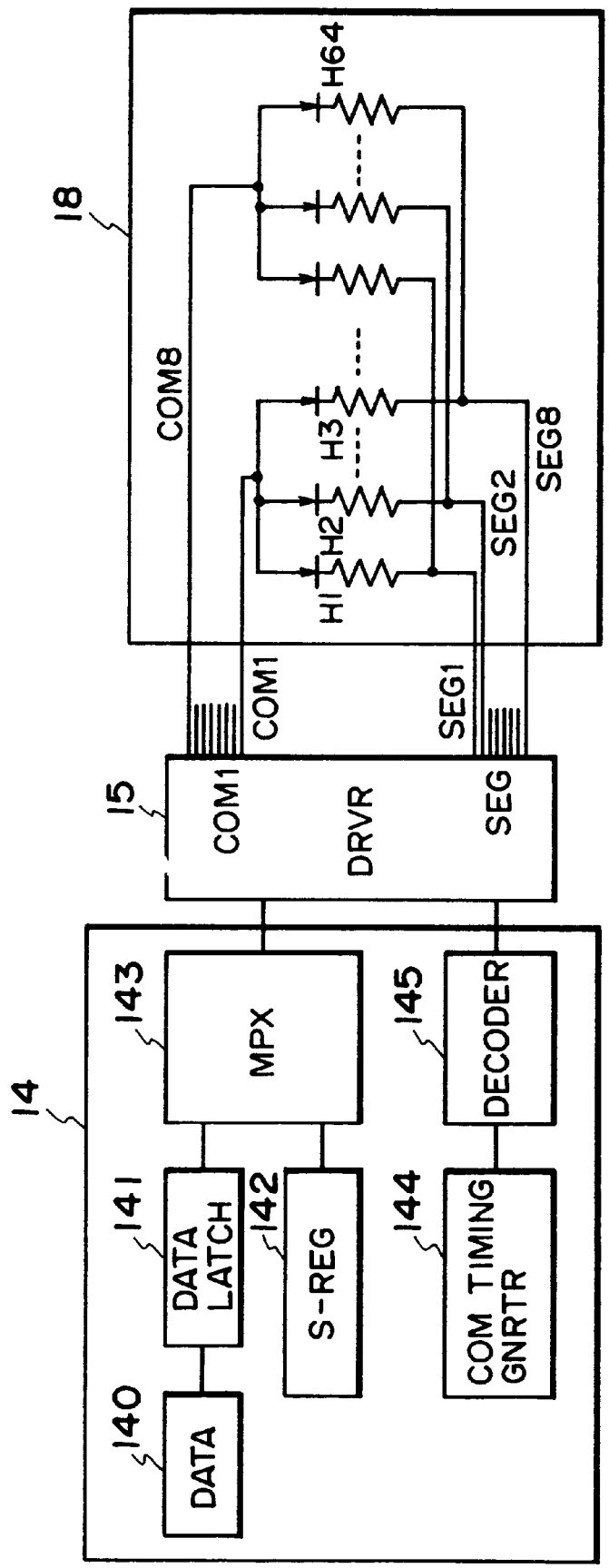
FIG. 10 is a block diagram which depicts the details of the gate array and the like illustrated in FIG. 9.

FIG. 10 is an example of a circuit diagram which shows the details of the various sections illustrated in FIG. 9. The gate array 14 comprises data 14, a data latch 141, a segment (SEG) shift register 142, a multiplexer (MPX) 143, a common (COM) timing generation circuit 144, and a decoder 145. The recording head 18 has a diode matrix structure, in which the driving current flows to the ejection heaters (H1 to H64) at which a common signal COM and a segment signal SEG coincide. As a result, ink is heated, and ejected.

The aforementioned decoder 145 decodes the timing generated by the aforementioned common timing generation circuit 144, and selects one of the common signals COM 1–8 The data latch 141 latches the recording data read out of the DRAM 13, by a unit of eight bits. These data are outputted as segment signals SEG 1–8 by the multiplexer 143, which follows the segment shift register 142. The output from the multiplexer 143 can be transformed into various forms, for example, a one bit unit, a two-bit unit, or a unit comprising all eight bits, which will be described later.

To describe the operation of the above control structure, as recording signals enter the interface 10, the recording signal is converted into recording data between the gate array 14 and MPU 11. Then, the motor drivers 16 and 17 are driven, and at the same time, the recording head is driven by the recording data sent to the head driver; an image is printed.

In the above description, a case in which a recording head comprising 64 nozzles was described. However, recording heads different in the number of nozzles can be controlled, or driven, by the same control structure as the one described above.

Figure 11:
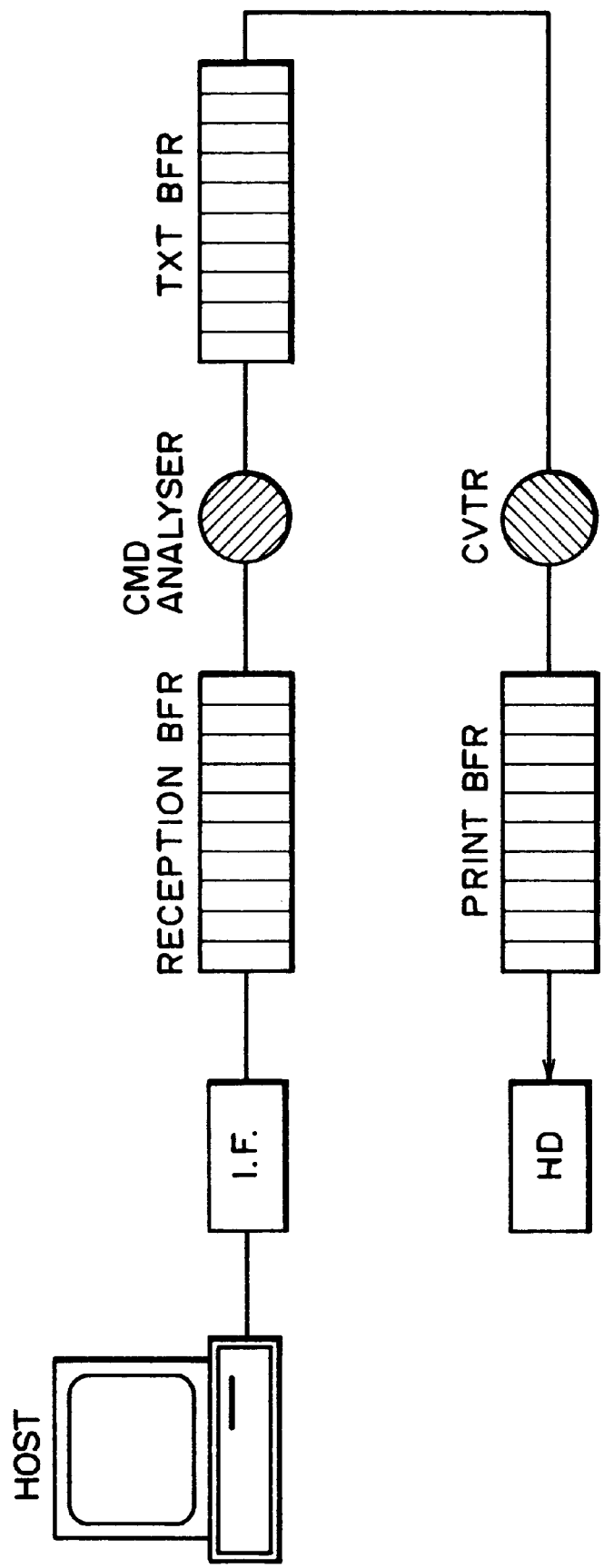
FIG. 11 is a schematic drawing which depicts the recording data flow in the recording apparatus illustrated in FIG. 7.

Next, referring to FIG. 11, the flow of the data within the recording apparatus will be described. The recording data sent from a host computer are stored in a reception buffer in the recording apparatus, through an interface (I.F.). The reception buffer has a capacity of several thousand bytes to several tens of thousands of bytes. After being stored in the reception buffer, the recording data are analyzed in terms of a command, by a common analysis section, and then are sent to a text buffer. In the text buffer, the recording data is retained in an intermediary form, by a volume equivalent to a single line, and additional data regarding the printing position for each character, the modification type, the size, the character code, the font address, and the like are added. The capacity of the text buffer is different depending upon the recording apparatus type. For example, in the case of a serial type printer, the capacity is equivalent to only several lines of printing, whereas in the case of a page printer type, the capacity is equivalent to a single page of printing. Further, the recording data from the text buffer are developed into binary data, and stored in a print buffer. Then, these binary data are sent to the recording head as the recording data to print an image. In this embodiment, the binary data stored in the print buffer are sent to the recording head after being put through a mask pattern, which thins the data at a predetermined rate. Therefore, it is possible to select a mask pattern after examining the data while they are still stored in the print buffer. Some of recording apparatuses do not have a text buffer. In the cases of such recording apparatuses, the recording data stored in the reception buffer are developed at the same time as they are subjected to the common analysis. Then, they are written into the print buffer.

Figure 12:
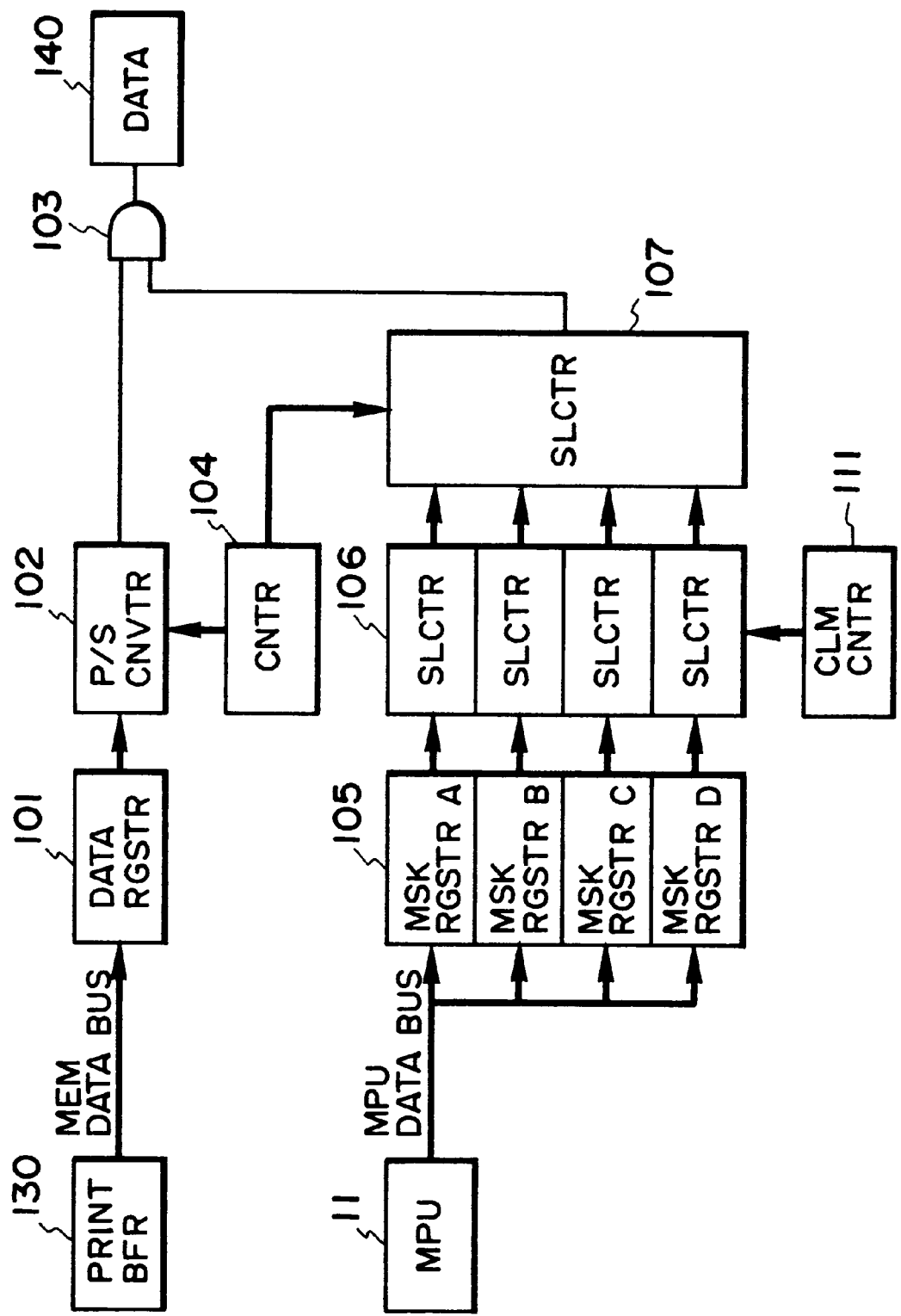
FIG. 12 is a block diagram of the data transfer circuit which is an essential part of the gate array in FIG. 9.

FIG. 12 is a block diagram which depicts the structure of the data transfer circuit in this embodiment. In this drawing, a referential character 101 designates a data register, which is connected to a memory bus, and temporarily stores the print data after reading them out of the prior buffer 130 among the memories. A referential character 102 designates a parallel-serial converter for converting into serial data, the data stored in the data register 101. A referential character 103 designates an AND gate for placing a mask on the serial data, and a referential character 104 designates a transfer counter for managing the data transfer count.

A referential character 105 designates a register which is connected to a CPU data bus, and stores mask patterns. A referential character 106 designates a selector for selecting a line position in a mask pattern. A referential character 111 designates a column counter for controlling the column position.

The data transfer circuit illustrated in FIG. 12 serially transfers the 128 bit print data to the printing head in response to the printing signals sent from the MPU 11. The printing data having been stored in the print buffer area temporarily stored in the data register 101, and converted into serial data by the parallel-serial converter 102. After the conversion, the serial data is subjected to a mask by the AND gate 103, and then, are transferred to the printing head. The transfer counter 104 stops data transfer as soon as the amount of the data in terms of bit count reaches 128.

The mask register 105 comprises mask registers A, B, C and D, and stores the mask patterns written by the MPU 11. Each register stores a 4 vertical bits×4 horizontal bits mask pattern. The selector 103 selects the value in the column counter so that a mask pattern matching the column position is selected. Also, the selector 107 selects the value in the transfer counter 104 as a selection signal so that a mask pattern matching the line position is selected. The transfer data are subjected to a mask on the basis of the mask pattern data selected by the selectors 106 and 107.

In the above description of this embodiment, a mask register comprising four sub-registers was described. However, the number of the sub-registers is optional.

In this embodiment, the masked transfer data are directly supplied to the recording head. However, they may be temporarily stored in the print buffer.

Hereinafter, the embodiments of the present invention will be described with the reference to the recording apparatus described above.

Embodiment 1

In this embodiment, a multi-scan recording method will be described. According to a multi-scan recording method, a recording head comprises a plurality of image recording elements which are aligned in the first direction, or the direction in which recording medium is conveyed. The number of picture elements placeable with a single scanning movement of the recording head in the primary scanning direction, or the second direction different from the first direction, is reduced at a predetermined interval with the use of a thinning mask. A unit strip of recording field extending in the line direction or the raster direction, is constituted of a plurality of sub-strips of recording field, and each sub-strip of recording field corresponds to a plurality of rasters. In other words, the unit strip of recording field corresponds to a plurality of raster lines, and a strip of recording field correspondent to each raster extending in the second direction is recorded with dots from different nozzles. In a printing operation, first, the picture elements are activated corresponding to the first set of sub-strips of recording field with the use of the above described recording arrangement, and then, after the recording of the first set of the sub-strips of recording field is completed, the picture elements are activated corresponding to the adjacent sub-strip of recording field with the use of the same printing arrangement. Next, an example of such a recording method will be described with reference to drawings.

Figure 13:
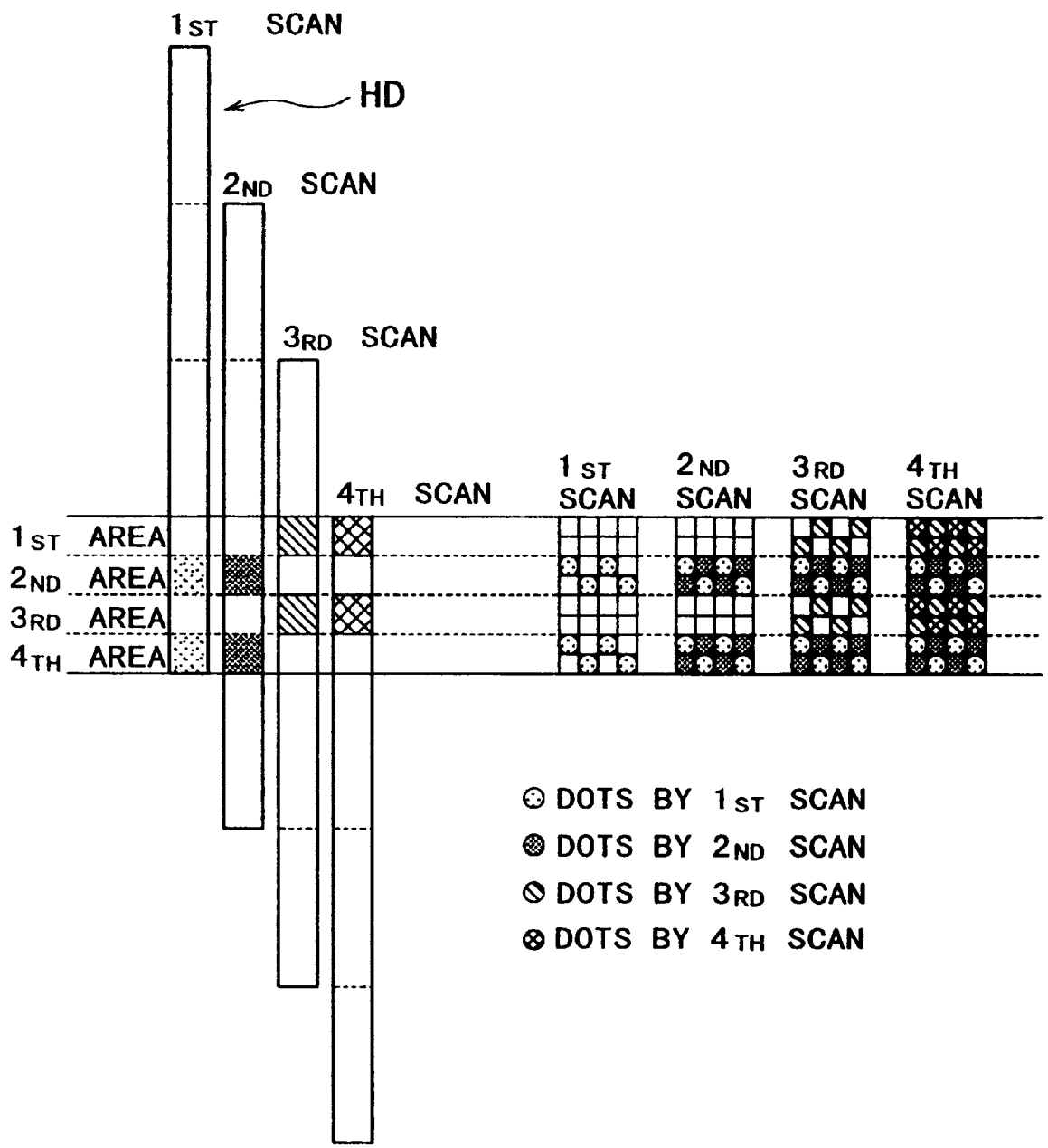
FIG. 13 is a schematic drawing which depicts the recording sequence of the multi-scan recording method in the first embodiment of the present invention.

An example of a recording process in accordance with the present invention is depicted in FIG. 13. The multi-scan recording method in this embodiment uses a recording head comprising 32 recording elements. Also, in this embodiment, a unit strip of recording field is completed by four recording runs of the recording head over the same unit strip of recording field. The nozzle count and the scanning counts do not need to be limited to the counts used in this embodiment. Also, a patch of recording area referred to in this embodiment corresponds to 8×4 picture elements.

The recording head schematically illustrated in FIG. 13 comprises 32 recording elements (nozzles). This recording head is divided into four sections, and each section is activated during its own recording run; the recording of a unit strip of recording is completed through four recording runs by the recording head. The distance the recording medium is moved after each recording run of the recording head is set at ¼ the length of the range in which 32 nozzles of the recording head are aligned. Also in this embodiment, a unit strip of recording field to be completed through the four recording runs by the recording head is divided into four sub-strips of recording field: first, second, third and fourth sub-strips. During the first recording run by the recording head, recording is made across the second and fourth sub-strips of recording field, and no recording is made across the first and third sub-strips of recording field. During the first recording run, recording density is set at 50%, being equivalent to a recording density of 25% relative to the entirety of a unit strip of recording area. Next, during the second recording run, recording is also made across the second and fourth sub-strips of recording field, and no recording is made across the first and third sub-strips of recording field. Also during this second run, the recording density is kept at 50%. After the second run, the recording across the second and fourth sub-strips of recording field is complete. Next, during the third run, recording is made across the first and third sub-strips of recording field. Also during this run, recording is made at 50% recording density, which is equivalent to a recording density of 25% relative to the entirety of a unit strip of recording field. Lastly, during the fourth run, recording is made across the first and third recording sub-strips at a thinned recording density of 50%, completing the recording across the entirety of the unit strip of recording field. In this embodiment, each unit strip of recording field is divided into four sub-strips, and recording is made across two non-adjacent sub-strips during each recording run by the recording head. That is, first, the printing across a first pair of non-adjacent recording sub-strips, or the second and fourth recording sub-strips, is completed, and then, the printing across the second pair of nonadjacent recording sub-strips, or the first and third recording bus-strips, is completed. The width of a sub-strip of recording field, in the sheet conveyance direction, is equal to the interval of the illusionary lines. In this embodiment, a unit strip of recording field is divided into four sub-strips with a width of ¼ the width of each unit strip of recording field, and therefore, the interval of the illusionary lines is smaller, that is, the cycle of illusionary line appearance is short.

Figure 14:
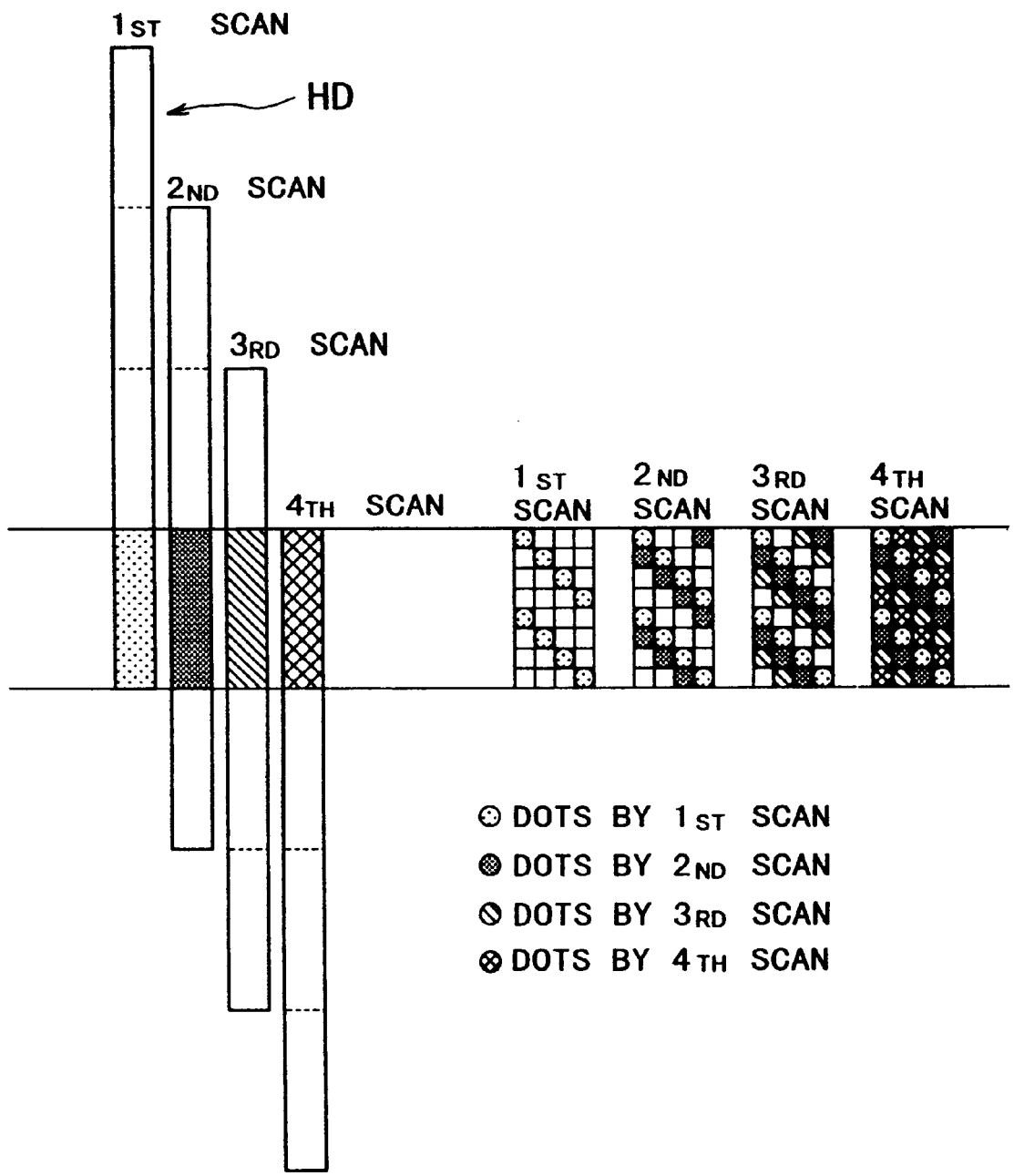
FIG. 14 is a schematic drawing which depicts an example of the recording sequence of a conventional multi-scan recording method.

At this time, the steps followed when a conventional multi-scan recording method is used will be described with reference to FIG. 14. FIG. 14 also depicts a single unit of recording area occupied by 8×4 picture elements.

The recording head used by this recording method is the same as the one illustrated in FIG. 13. The distance a piece of recording medium is conveyed after each recording run of the recording head is also set at a distance equivalent to ¼ of the distance between the nozzle at one end of the recording head and the nozzle at the other end of the recording head. The recording density is set at a thinned density of 25% for each recording run of the recording head, completing the recording of a single recording strip through four recording runs by the recording head. During the first run, recording is made at a recording density of 25% (equivalent to eight picture element). Also during the second, third, and fourth recording runs, the recording is made at the recording density of 25%, completing the printing of the entirety (100%) of a single recording strip as the fourth run ends. In this case, the width of the recording strip covered by a single run of the recording head is equivalent to eight consecutively placed picture elements, in other words, the width of a single recording strip in the recording sheet conveyance direction. This is four times the width of the recording strip covered by a single run of the recording head in the multi-scan recording method depicted by FIG. 13. It seems to be natural that the illusionary lines are more visible when a conventional multi-scan recording method is used.

Figure 15:
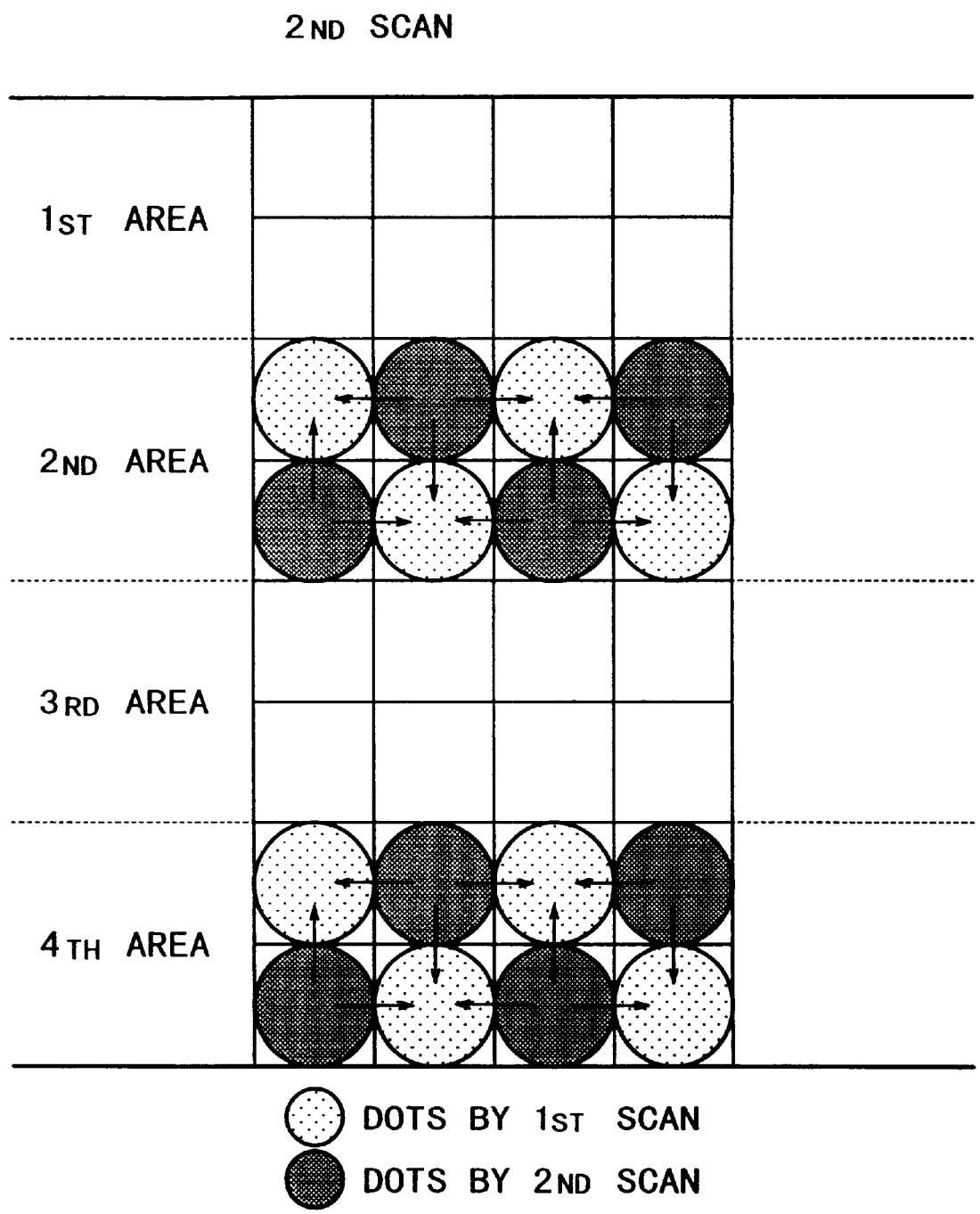
FIG. 15 is a schematic drawing which depicts an example of the ink draw which occurs when the multi-scan recording method in the first embodiment is employed.
Figure 16:
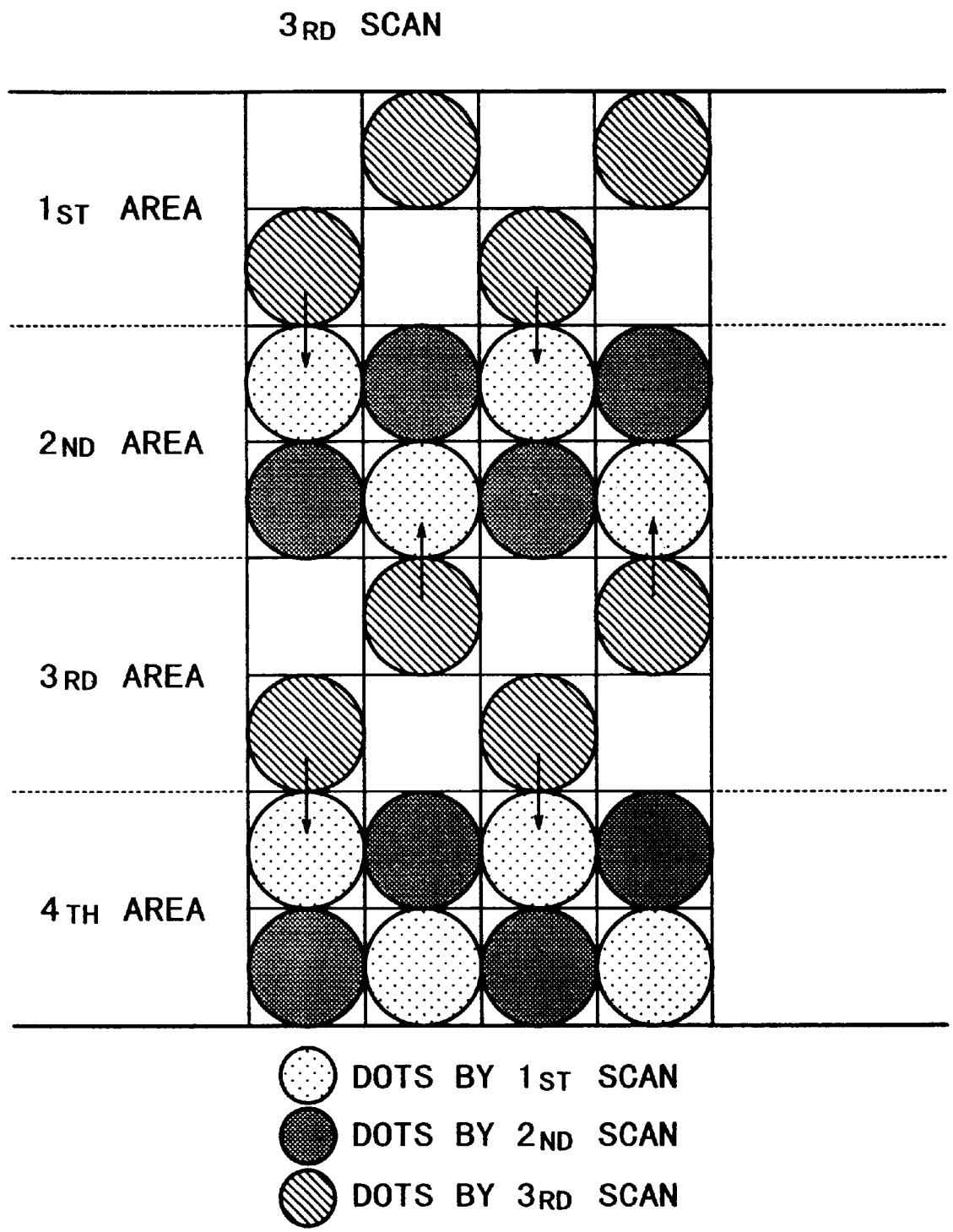
FIG. 16 is a schematic drawing which depicts an example of the ink draw which occurs when the multi-scan recording method in the first embodiment is used.
Figure 17:
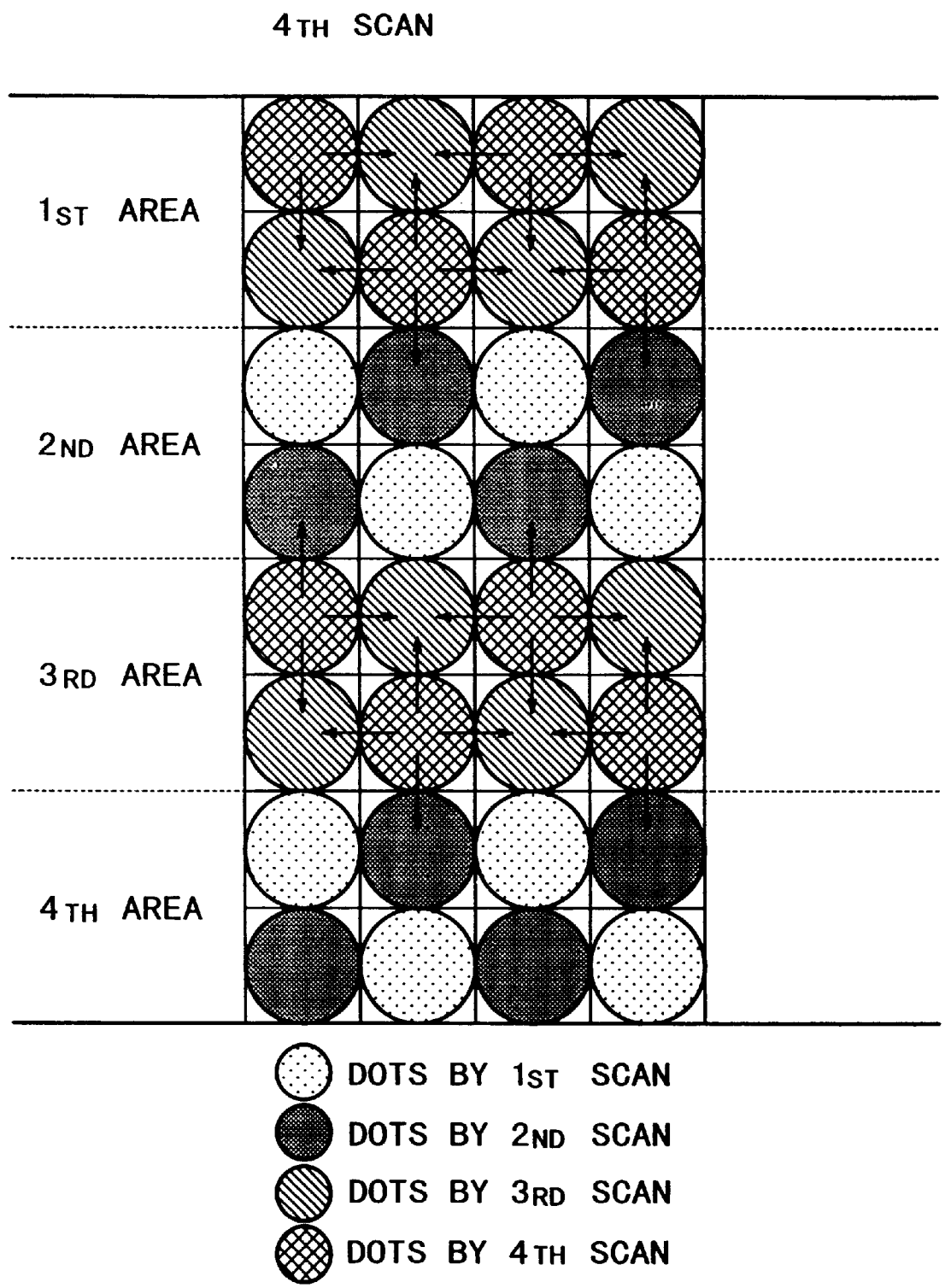
FIG. 17 is a schematic drawing which depicts an example of the ink draw which occurs when the multi-scan recording method in the first embodiment is used.

During a printing operation carried out with the use of the multi-scan recording method illustrated by FIG. 13, the ink in a given dot formed by an ink droplet which lands during one of the printing runs is attracted by the ink in the immediately adjacent dots formed during the other printing runs of the recording head. This phenomenon will be described with reference to FIG. 15, which shows the dots formed with the use of the multi-scan recording method illustrated by FIG. 13, during the first and second runs of the recording head. During the second run, does are formed immediately adjacent to the dots formed during the first run. In this situation, the ink in each dot formed during the second run is drawn by the dots having already been formed as indicated by arrow marks. This drawing of ink between the dots formed during the first run of the recording head and the dots formed during the second run occurs in such a manner that the forces generated by the dots are canceled among them. Therefore, despite the fact that this phenomenon continuously occurs in the direction of the recording run of the recording head, the phenomenon does not effect an image with the illusionary lines. FIG. 16 illustrates the dots formed during the third run of the recording head depicted in FIG. 13, along with the dots formed during the first and second runs. In the drawing, the recording of the second and fourth sub-strips had been completed. The ink in the dots formed during the third run is drawn into the second and fourth sub-strips. Next, referring to FIG. 17, not only is the ink in the dots formed during the fourth run drawn into the adjacent dots formed during the third run, but also it is slightly drawn into the adjacent does formed during the second and fourth runs. In other words, the ink in the dots formed during the third recording run of the recording head, and the ink in the dots formed during the fourth recording run of the recording head, are drawn into the adjacent sub-strips, or the second and third sub-strips, respectively. As described previously, if ink is drawn in the same direction, and this ink draw phenomenon consecutively occurs in the scanning direction by the recording head, the illusionary line appears, and the interval of two adjacent illusionary lines is the same as the width of a sub-strip of recording field. Thus, in this embodiment, the interval of two adjacent illusionary lines is equal to the combined with of two picture elements, which is approximately 0.14 mm at 360 dpi (2 nozzle×25.4 mm/360 dpi). In other words, the illusionary lines are scarcely visible.

As described above, in this embodiment, each sub-strip of recording field is divided into a plurality of even narrower strips of recording field with a given width, so that the recording of each sub-strip of recording field is carried out through multiple recording runs by the recording head. Therefore, this embodiment is also effective to directly dissipate the ink drawing force which is the cause of the streaky appearance. For example, in FIG. 17, the ink in the dots formed during the fourth recording run by the recording head is drawn into the adjacent dots in the second and fourth recording sub-strips, and also into the adjacent dots formed during the third run. Therefore, the drawing of the ink into the second and fourth sub-strips, which is the very cause of the streaky appearance, can be reduced.

Next, the sequence followed to carry out the multi-scan recording method in this embodiment will be described. First, in Step 1, a set of recording data is received. Usually, the received data contains not only the data of an image to be recorded, but also most of the information necessary for a recording operation, for example, the information regarding the recording medium or the information regarding the recording method, based on which the various settings of the main assembly of an image forming apparatus are determined. Next, in Step 2, the number of recording runs is set. The number of the recording runs by the recording head per a single unit of recording strip is determined depending on the recording head in use, the recording data, and can be directly set through the control panel of the apparatus main assembly or with the use of a utility software or the like. Next, in Step 3, the number of sub-strips into which a single unit of recording strip is divided is determined. In other words, the width of each sub-strip, which corresponds to the frequency at which the illusionary lines appear, is set. In Step 4, a dot density thinning mask is selected based on the width of the sub-strip. Normally, that is, when recording is made at 100%, the number of dots is thinned according to the number of the recording runs by the recording head per unit of recording strip. However, in order to increase recording density or the like, the number of dots per unit of recording strip may be increased in Step 4 in which a mask is selected. Next, in Step 5, the distance a piece of recording medium is advanced after each recording run of the recording head is set. Usually, when a multi-scan recording method is used, the value obtained by dividing the distance correspondent to the number of the recording elements in the recording head by the number of recording runs per unit of recording strip, is used as this distance. Next, recording is carried out under the conditions set in the preceding steps. In Step 7, it is determined if there remains recording data. If data remains, Step 1 is taken again to receive another set of data, and then, each of the aforementioned steps is repeated. Then, if it is determined in Step 7 that no recording data remains, this recording sequence is ended. According to this recording sequence, each unit of recording strip is divided into a predetermined number of sub-strips to set the width of each sub-strip, so that the rate at which the illusionary lines appear, can be controlled. Also it is possible to set the width of a sub-strip at various values, so that the width can be optionally selected by a user, or can be set on the basis of other factors such as the characteristics of the recording medium, ambient temperature or humidity, and the like.

As described above, according to this embodiment, the cycle at which the illusionary lines appear can be controlled by determining the width of each of the plurality of sub-strips of recording field into which each unit of recording strip is divided. Further, the dividing of each unit of recording strip provides not only the same effects a those given by a conventional multi-scan recording method, but also an additional effect that the ink drawing force which is the essential cause of the illusionary lines can be controlled. Therefore, the illusionary lines, which are created between the immediately two adjacent recording sub-strips when a multi-scan recording method is employed, can be made difficult to recognize by reducing the cycle at which the illusionary lines are created. Further, one of the characteristics of a conventional multi-scan recording method is effectively utilized to weaken the ink drawing force which is the essential cause of the illusionary lines. As a result, it is possible to provide a recording method and a recording apparatus, which can record a higher quality image at a higher speed.

Embodiment 2

In this embodiment, a multi-scan recording method, which was devised in consideration of the durability of a recording head, is described. This method prevents any ejection element of a recording head from being used at a drastically higher frequency than the rest.

The method in this embodiment is a modification of the multi-scan recording method in the first embodiment, and prevents given recording elements from being used with a substantially higher frequency than the rest, by using a different dot density thinning mask for each recording run of the recording head.

Figure 19:
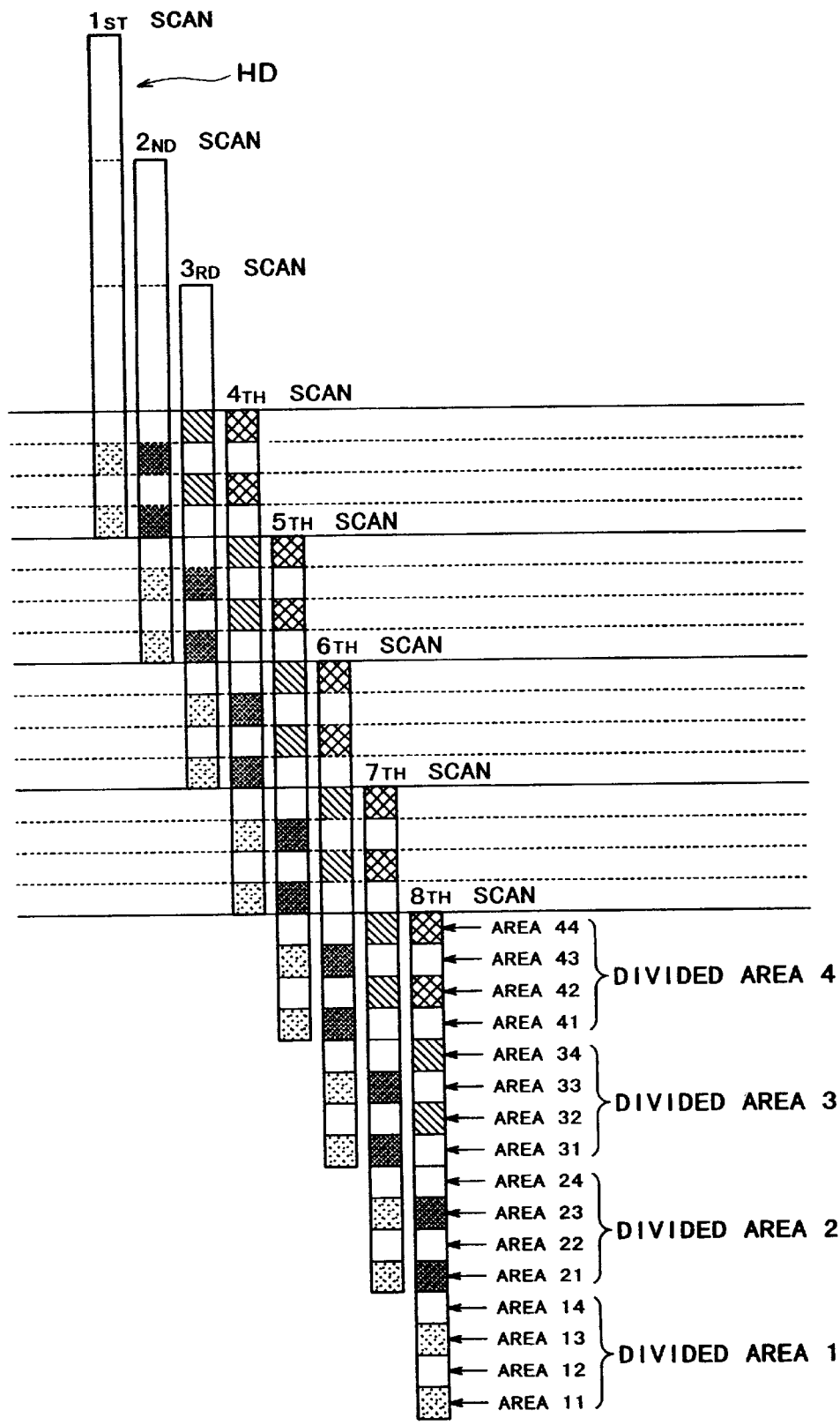
FIG. 19 is a schematic drawing which depicts an example of the multi-scan recording method in the second embodiment of the present invention.

FIG. 19 given an example of a multi-scan recording method in which the same dot density thinning mask is used for every recording run of the recording head. The drawing illustrates the first run to the eighth run. In this case, each unit of recording strip is completed through four recording runs. Thus, the recording head is divided into four sections. First, the usage of each recording element will be described. In Section 1, the sub-section 11 and sub-section 13 are used, and the sub-sections 12 and 14 are not used. Similarly, in Section 2, only the sub-sections 21 and 23 are used, and Section 3, only the sub-sections 32 and 34 are used. In Section 4, only sub-sections 42 and 44 are used. This usage arrangement causes only specific recording elements to be used, and therefore, is desired to be improved in consideration of the durability of the recording head.

Figure 20:
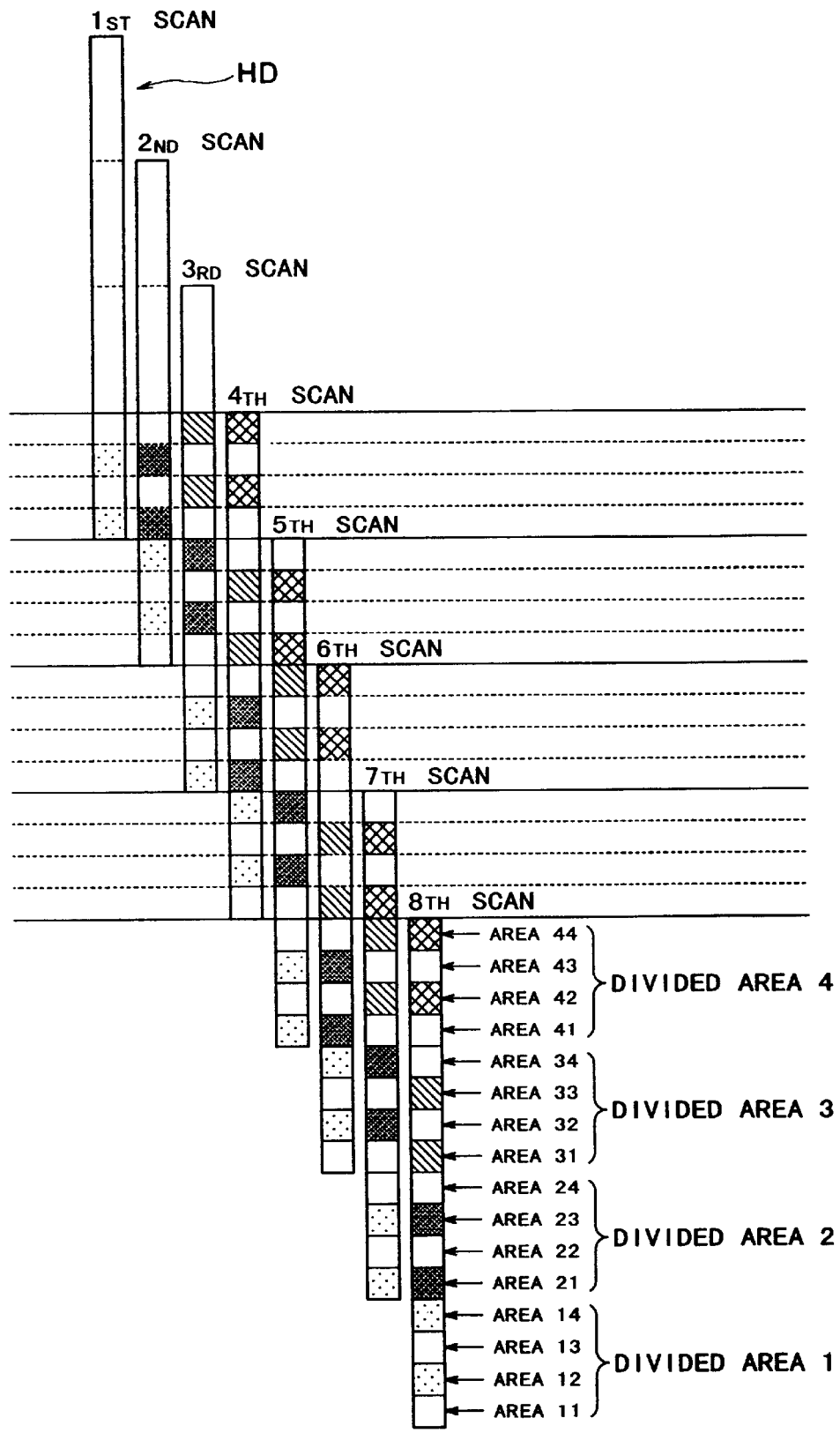
FIG. 20 is a schematic drawing which also depicts an example of the multi-scan recording method in the second embodiment.

The method used in this embodiment to select a dot density thinning mask will be described next. FIG. 20 illustrates an example of a recording operation in which the multi-scan recording method in this embodiment is used. The recording head is divided into four sub-sections. As for the usage of each recording element, in Section 1, sub-sections 11 and 13 are used during the first recording run of the recording head, but sub-sections 12 and 14 are used during the second run. Similarly, during each of the following recording runs of the recording head, designated with an odd number, sub-sections 11 and 13 are used, and during the each of the following recording runs designated with an even number, sub-sections 12 an 14 are used. Also in Section 2, sub-sections 21 and 23 used during each of the following recording runs designated with an odd number, and sub-sections 22 and 24, used during each of the following recording runs designated with an even number, are alternately positioned. This is also true with Sections 3 and 4, in which the sub-sections used during each of the following recording runs designated with an odd number, and the sub-sections used during each of the following recording runs designated with even number, are alternately positioned. With this usage arrangement, it does not occur that only specific recording elements are used. Therefore, this usage arrangement is advantageous in terms of recording head durability.

Figure 18:
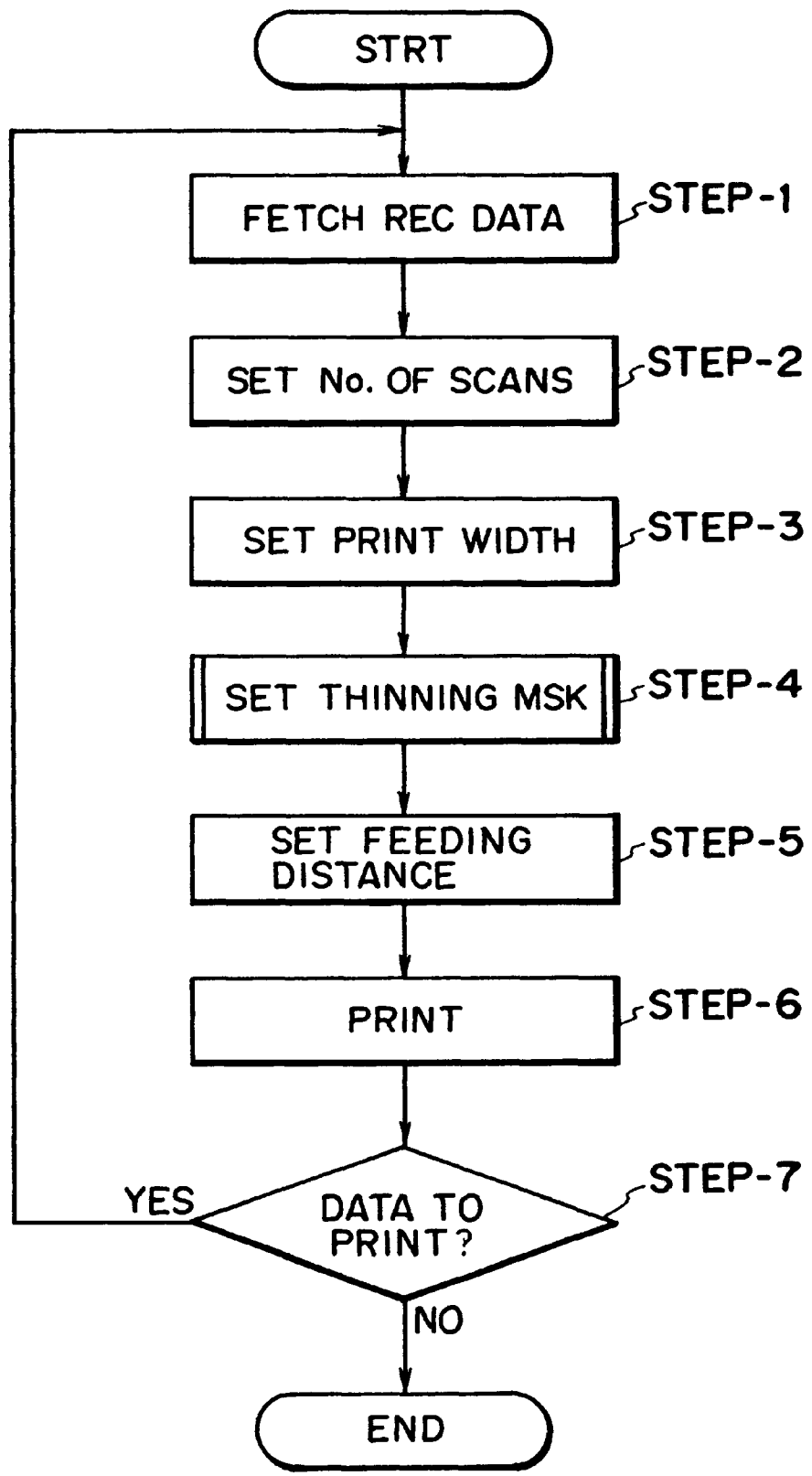
FIG. 18 is a flow chart which shows the recording steps in the multi-scan recording method in the first embodiment.
Figure 21:
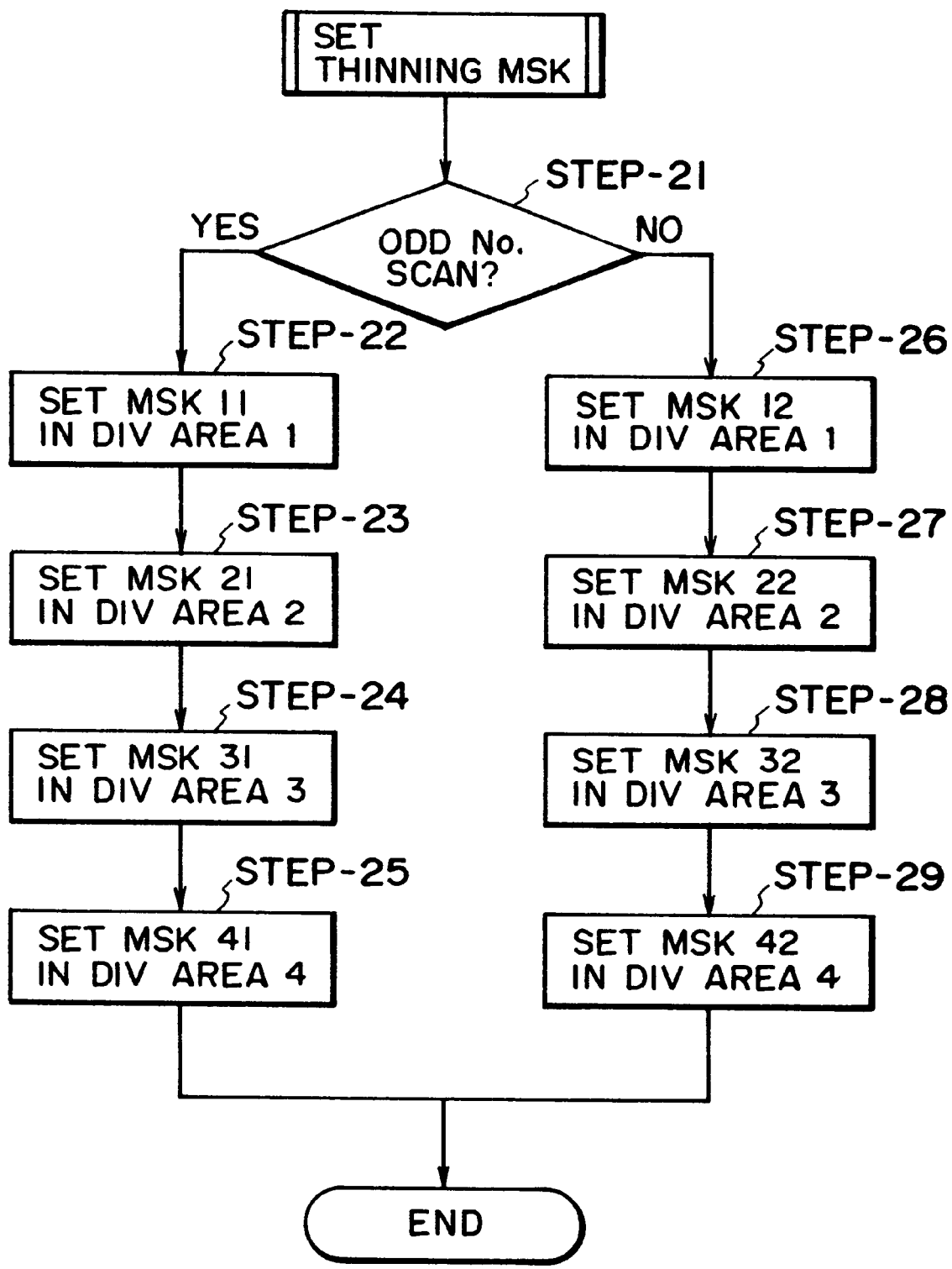
FIG. 21 is a flow chart which shows the dot density thinning mask selecting sequence in the multi-scan recording method in the second embodiment.

Next, the sequence followed to carry out the method in this embodiment will be described. FIG. 21 illustrates the sequence followed to select a dot density thinning mask according to the multi-scan recording method in this embodiment. In terms of general setup, this sequence is similar to the sequence illustrated in FIG. 18. Thus, only the sub-sequence in which a dot density thinning mask is selected will be described.

Referring to FIG. 21, first, in Step 21, it is determined whether or not the next recording run is designated with an odd number. When it is a run designated with an odd number, Step 22 is taken, in which a dot density thinning mask 11 is selected for Section 1. Then, Steps 23, 24 and 25 are taken to select dot density thinning masks 21, 31 and 41, for Sections 2, 3 and 4, correspondingly, ending this sub-sequence. When the next recording run in a run designated with an even number, Steps 26, 27, 28 and 29 are taken in this order, to select dot density thinning masks 12, 22, 32, and 42, for sections 1, 2, 3 and 4, correspondingly, ending thin sub-sequence. In other words, a different mask is selected for each recording run and each section.

In this embodiment, the printing across a single unit of recording strip is completed through four recording runs by the recording head. However, even if the number of the recording runs is different from the number in this embodiment, a mask can be selected in the same manner using the same sub-sequence.

FIG. 22 shows examples of a dot density thinning mask. The masks in this drawing are correspondent to the sequence given in FIG. 21. They are masks which match a set of 8×4 picture elements. In the drawing, a black circle represents a dot. With the use of these dot density thinning masks, the multi-scan recording method illustrated in FIG. 20 can be carried out.

As described above, according to this embodiment, it is possible to select a different dot density thinning mask for each recording run of the recording head and also for each of the sections into which the recording head is divided. Therefore, it is possible to prevent any recording element of a recording head from being used with a frequency substantially higher than the rest, making therefore it possible to increase the service life of a recording head. Also, regarding the illusionary line, this embodiment is just an effective as the first embodiment, being able to provide a recording method and a recording apparatus capable of recording a higher quality image at a higher speed than a conventional recording method and a conventional recording apparatus.

Embodiment 3

Next, a multi-scan recording method which switches a dot density thinning mask in response to the state of a set of recording data will be described as the third embodiment of the present invention. Also in this embodiment, any recording element in a recording head is prevented from being used with a substantially higher frequency than the rest, as in the second embodiment.

Figure 23:
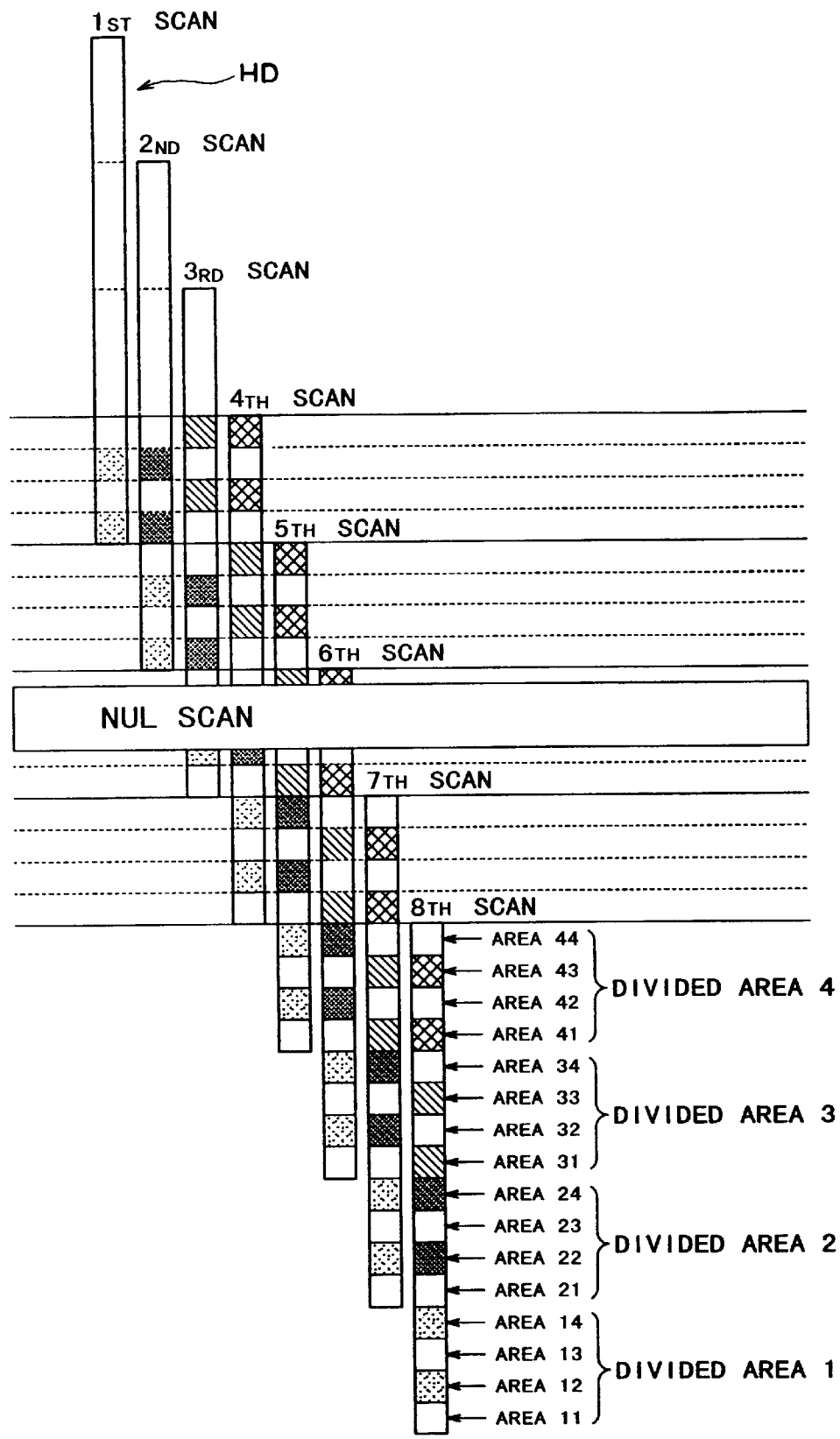
FIG. 23 is a schematic drawing which depicts an example of the multi-scan recording method in the third embodiment.

In this embodiment, it is determined whether or not a set of recording data correspondent to a given unit of recording strip contains a section which effects a null raster across a given sub-strip, and mask selection is changed based on the presence or absence of such a section. FIG. 23 illustrates an example of the multi-scan recording method in this embodiment. During the recording runs caused by the data section prior to the null raster data section, only sub-sections 11 and 13 are used, and sub-sections 12 and 14 are not used. Similarly, in Section 2, the only the sub-sections 21 and 23 are used, and in Section 3, only the sub-sections 32 and 34 are used. In Section 4, only sub-sections 42 and 44 are used. However, during the recording runs controlled by the data section after the null raster data section, sub-sections 12 and 14 are used in Section 1. Similarly, in Sections 2, 3 and 4, sub-sections 22 and 24, sub-sections 31 and 33, and sub-sections 41 and 43, are used, correspondingly. This usage arrangement in which a dot density thinning mask is switched as the null raster data are encountered makes it unnecessary to switch the mask for every recording run. Therefore, processing speed is improved while preventing, as in the second embodiment, the problem that only a certain group of recording elements is used.

As described above, according to this embodiment, it is detected whether or not a set of recording data contains a section which effects a null raster, and a dot density thinning mask is switched as the null raster data section is encountered. Therefore, the speed at which the mask is selected is improved while preventing the problem that only a specific group of recording elements is used. Thus, the service life of a recording head is increased. In addition, this embodiment is also as effective as the first embodiment, regarding the illusionary lines, making it possible to provide a recording method and a recording apparatus capable of recording an image with higher quality at a higher speed.

Embodiment 4

Next, a multi-scan recording method which conveys recording medium at an irregular rate, instead of a steady rate, will be described as the fourth embodiment of the present invention. This method prevents the problem that only a certain group of recording elements is used. Also, a set of recording elements correspondent to a sub-strip of recording field consists of consecutively placed recording elements. With this arrangement, the magnitude of the problems which occur when a recording head with a large number of recording elements and a multi-scan recording method are used in combination can be reduced.

At this time, a problem which occurs when the number of recording elements of a recording head is increased to increase the recording speed of the recording head, will be described.

Figure 24:
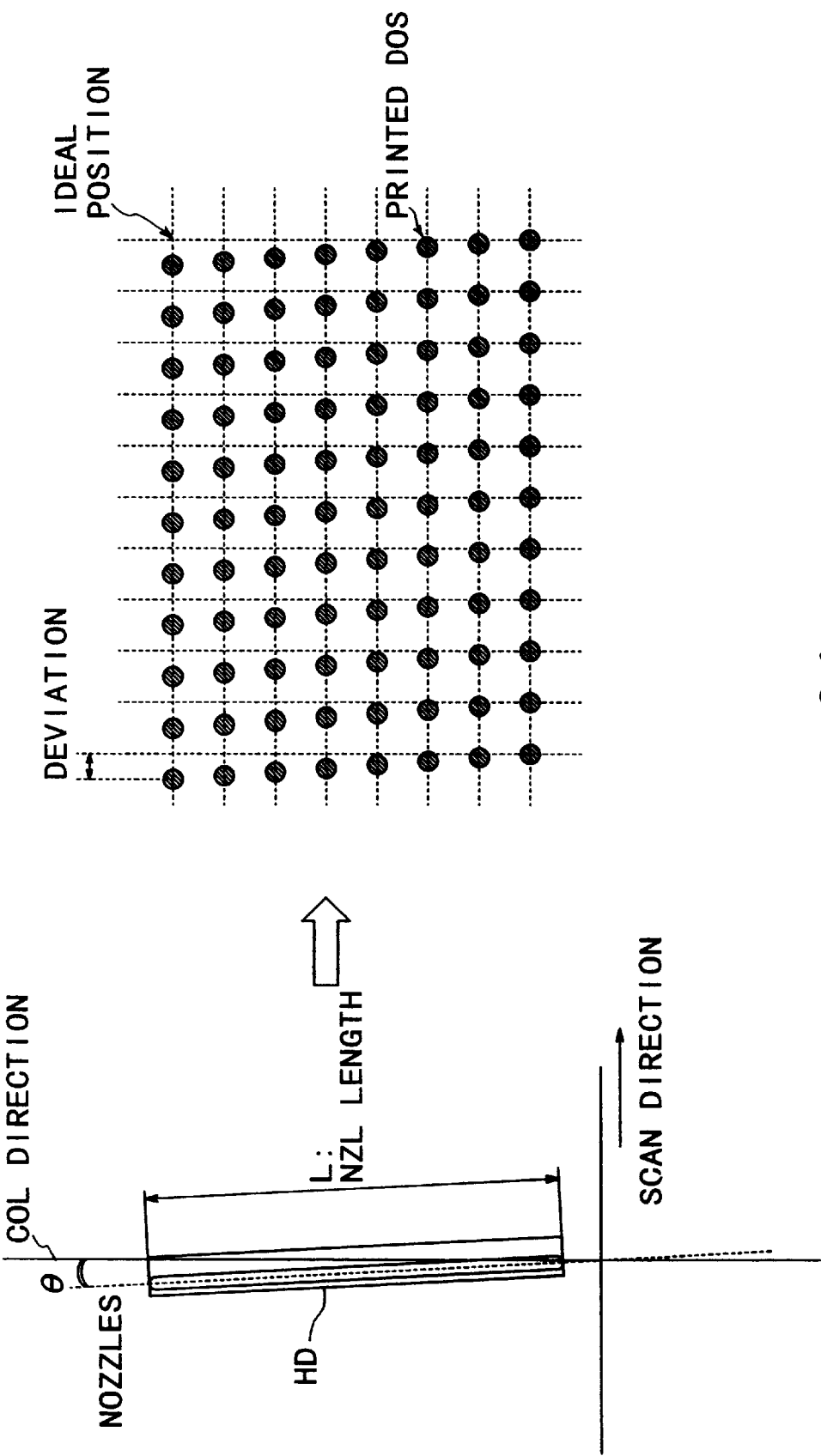
FIG. 24 is a schematic drawing which depicts a case in which recording is made by a recording head tilted due to the attachment angle error made while the recording head was attached.

For example, in a recording head which has 64 recording nozzles and is enabled to print at a recording density of 360 dpi, the length of the nozzle alignment is approximately 4.52 mm (=25.4 mm/360 dpi×64 nozzles) However, in the case of a recording head which has 256 recording elements and is enabled to record at the same recording density as the recording head with 64 recording elements, the length of the nozzle alignment is approximately 18.06 mm (25.4 mm/360 dpi×256 nozzles). In other words, the second recording head has four times the nozzle alignment length of the first one. Ideally, lengthening the nozzle alignment should not change the landing point accuracy of each recording ink droplet. However, in reality, the landing point of each ink droplet changes in response to the error in the angle at which a recording head is mounted as illustrated in FIG. 24. This is easily understandable in consideration of a certain amount of decrease in accuracy inevitable in mass production. For example, if the mounting angle of a recording head is off by 0.3 deg. from the referential direction, or the column direction, the ink droplet landing point error caused by a recording head with 64 recording elements becomes as high as approximately 23.6 $\mu$m (=4.52 mm×sin 0.3 deg.), whereas the ink droplet landing point error caused by a recording head with 256 recording element becomes as high as approximately 94.6 $\mu$m (18.06 mm×sin 0.3 deg.). In an image recorded with a resolution of 360 dpi, the distance between two adjacent picture elements is approximately 70 $\mu$m. Therefore, the ink droplet landing point error caused by the recording head with 64 recording element does not manifest as serious image flaws. However, in the case of the recording head with 256 recording elements, the mounting angle error of 0.3 deg. causes a given ink droplet to deviate from its intended landing point by a distance equal to, or higher than, the distance between two adjacent picture elements, which is a serious problem.

Figure 25:
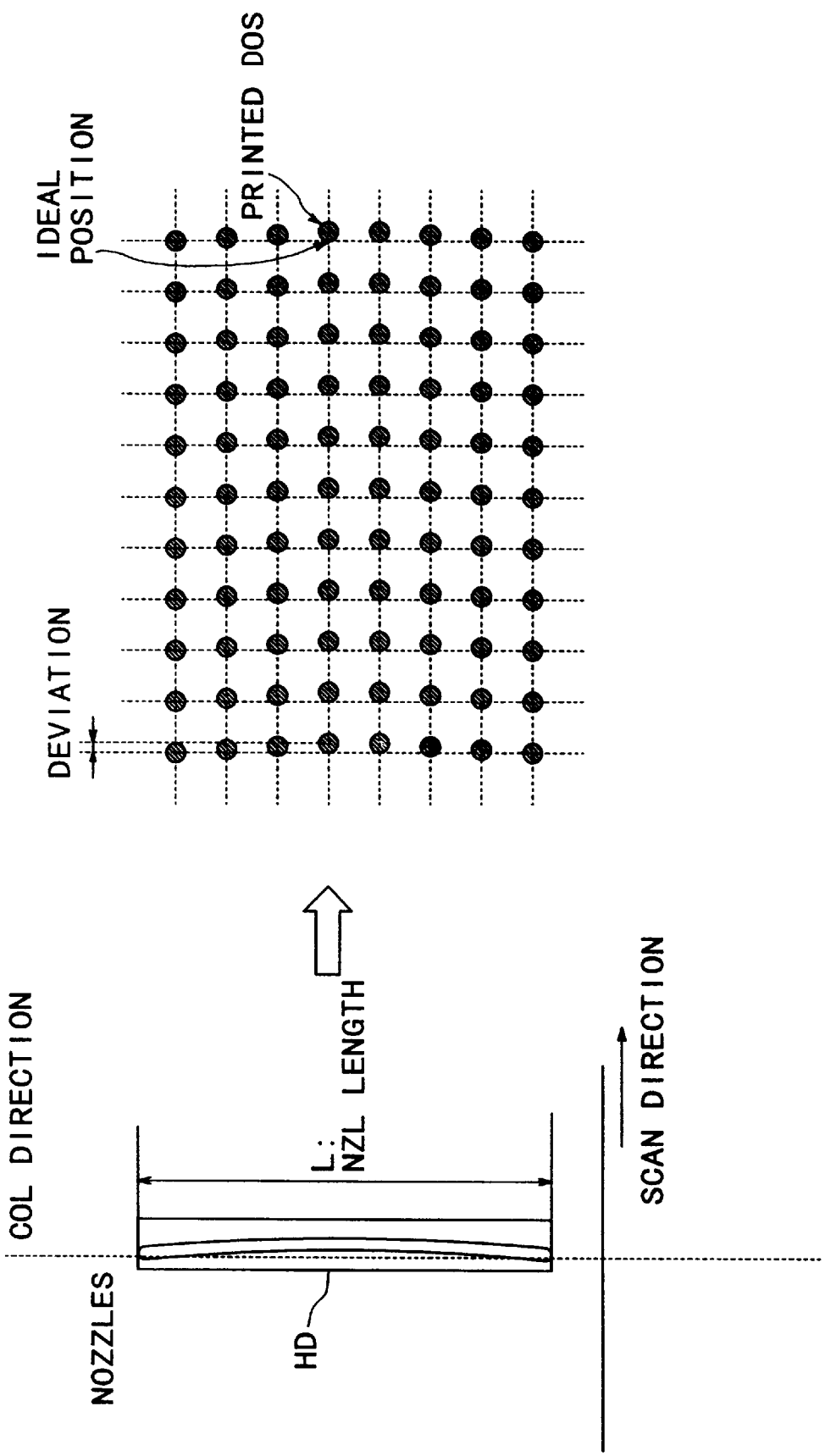
FIG. 25 is a schematic drawing which depicts a case in which recording is made by a recording head, the nozzle alignment portion of which is warped.

Further, if a recording head itself is warped as illustrated in FIG. 25, or the ejection direction is incorrect, the same ink droplet landing point errors as those described above will occur, which manifest as serious image flaws.

If one of the above described multi-scan recording methods, according to which a single strip of recording field correspondent to a single raster is recorded through two recording runs, each of which is made by a different recording element, to prevent the generation of nonuniform recording density, is used for recording, together with a recording head which is affected by the above described, the resultant image is affected by a texture (pattern) traceable to the errors in the ink droplet landing point, because the ink droplet landing point accuracy is different depending upon which recording element is used. In other words, as the number of recording elements placed in a single recording head is increased to increase recording speed, a texture for which the ink droplet landing point error of the recording head is responsible is generated.

Figure 26:
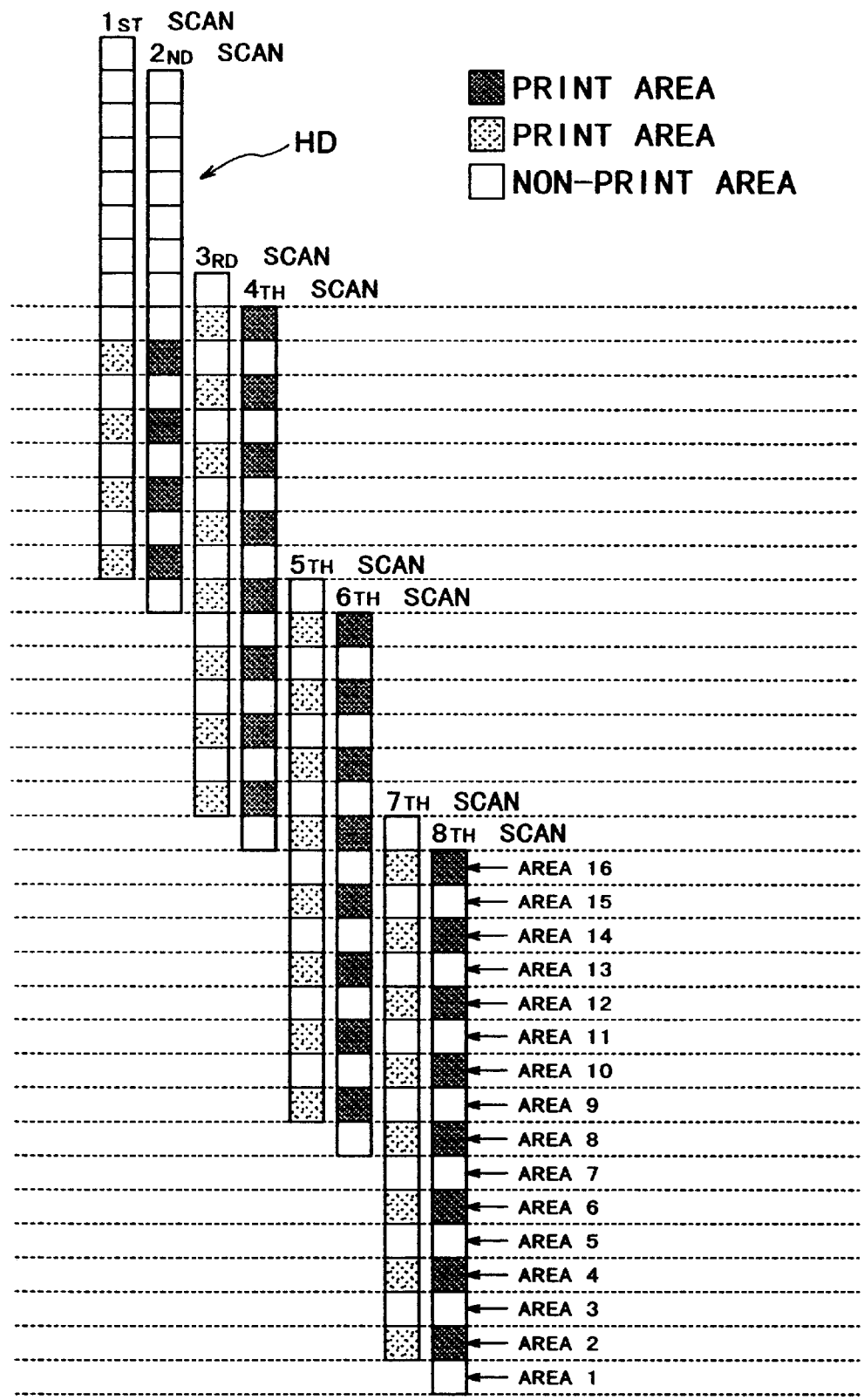
FIG. 26 is a schematic drawing which depicts an example of the multi-scan recording method in the fourth embodiment.

Thus, in this embodiment, each of the sub-strips created by dividing a unit strip of recording field is recorded by one of a group of adjacent recording elements. In other words, each of the plurality of sub-strips in a unit strip of recording field, which extends in the raster direction, is recorded by a different recording element among a group of adjacent recording elements. FIG. 26 illustrates an example of a multi-scan recording method in accordance with this embodiment. The recording head in FIG. 26 has 32 recording elements, and the multi-scan recording method depicted in FIG. 26 completes the recording of a unit strip of recording field through four recording runs by the recording head. In this case, the recording head is divided into 16 sections. Thus, the width of each section corresponds to two recording elements. During the recording runs designated with an odd number, Sections 1, 3, 5, 7, 9, 11, 13 and 15 are used for recording, whereas during the recording runs designated with an even number, recording is made with the use of Sections 2, 4, 6, 8, 10, 12, 14 and 16. More specifically, after the first recording run is made, recording medium is advanced by a width equal to the width of a single sub-strip of recording field in the recording medium conveyance direction, and then, the second recording run is made. Next, the recording medium is advanced by a distance equal to six times the width of a single sub-strip of recording field, and the third recording run is made. Next, the recording medium is advance by the distance equal to the width of a single sub-strip of recording field, and the fourth recording run is made. Then, the recording medium is advance by a distance equal to eight times the width of a single sub-strip of recording field, and the fifth recording run is made. In this case, regarding a single sub-strip of recording field, two groups of recording elements used to record each sub-strip of recording field are adjacent to each other like, for example, a combination of Sections 1 and 2, a combination of Sections 3 and 4, and the like. In other words, the same sub-strip of recording field is recorded with the use of recording elements which belong to the two adjacent groups, and therefore, the number of the ink droplet landing point errors traceable to the inaccuracy of a recording head can be reduced. In addition, it is possible to produce the same effects as those produced by a conventional multi-scan recording method.

Further, according to this embodiment, the distance the recording medium is advanced is varied, instead of being constant as in the preceding embodiments. More specifically, the distance is set in Step 5 through the sequence illustrated in FIG. 18, so that the distance the recording medium is advanced after each recording run becomes different from the other.

As described above, according to this embodiments, each sub-strip of recording field is recorded by a plurality of recording elements which belong to adjacent sections of the recording head. With this arrangement, the ink droplet landing point error, that is, the typical problem that occurs when a recording head with a large number of recording elements is used along with a multi-scan recording method, can be prevented, and therefore, it is possible to prevent the problem of the texture which results from the ink droplet landing point errors. Further, the problem that only specific groups of recording elements are used can be prevented. Thus, it is possible to prolong the service life of a recording head, and also to use a recording head enabled to record at a high speed, together with a multi-scan recording method. In addition, regarding the illusionary line, this embodiment has the same effects as the first embodiment, and can provide a recording method and a recording apparatus, which can provide both high quality and high speed.

Embodiment 5

Next, another recording method will be described as the fifth embodiment of the present invention. This recording method also employs a recording head in which a plurality of recording elements are aligned. Also according to this method, all the picture elements in a unit strip of recording field, which could be complete with a single sweeping movement, or scanning movement, of the recording head, are completed through a plurality of recording runs of the recording head. More specifically, a unit strip of recording field is divided into a plurality of sub-strips which extend in the raster direction. In operation, the picture elements in a given set of sub-strips are completed by the first recording run of the recording head, and then, the picture elements in the next set of sub-strips are completed. The sub-strips in the second set are adjacent to the correspondent sub-strips in the first set. This recording method will be described with reference to a drawing.

Figure 27:
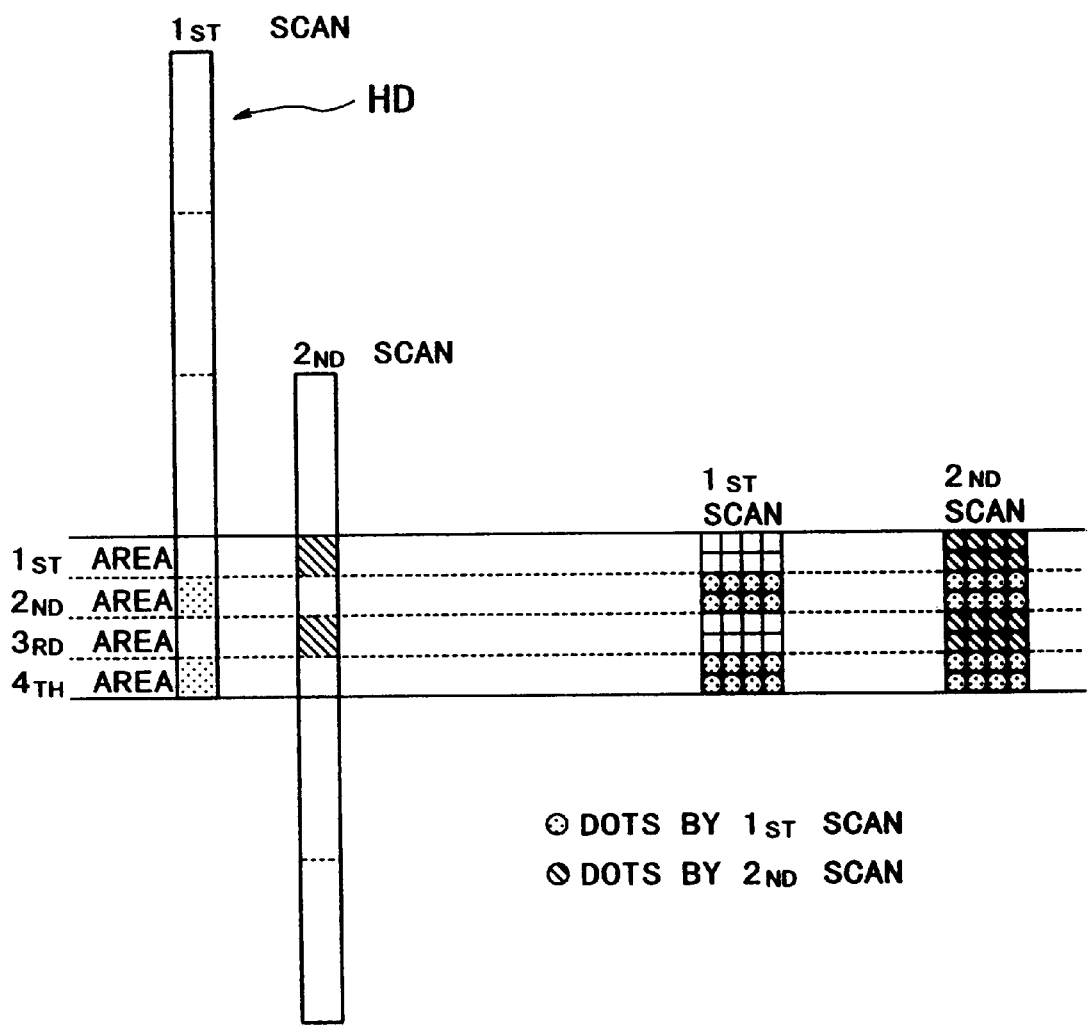
FIG. 27 is a schematic drawing which depicts the recording sequence in the fifth embodiment.

An example of the recording process in this embodiment is given in FIG. 27. The recording method in this embodiment is a multi-scan recording method which employs a recording head with 32 recording elements. The method will be described with reference to a recording mode in which a unit strip of recording field is completed through two recording runs. However, the number of nozzles, the number of recording runs per unit strip of recording field, and the like does not need to be limited to those in this embodiment. Also, this method is described with reference to a case in which a recording area the size of which corresponds to 8×4 picture elements is recorded.

In FIG. 27, the recording head comprises 32 recording elements (nozzles). This recording head is divided into four sections. In operation, a unit strip of recording field is completed through two recording runs. The recording elements used in the first and second runs belong to different sections of the recording head. As for the advancement of recording medium after each recording run, the distance the recording medium is moved is set at ½ the alignment length of 32 nozzles. Each unit strip of recording field to be recorded through two recording runs of the recording head is divided into four sub-trips: first, second, third, and fourth sub-strips. During the first run, recording is made across the second and fourth sub-strips, but not across the first and third sub-strips. Also during this first run, the recording is made without thinning the dot density. Thus, the overall dot density during this run is equivalent to a dot density of 50%. During the second run, recording is made across the first and third sub-strips. Also during this run, the recording across both sub-strips is made without thinning the dot density. Thus, the overall dot density during this run is also equivalent to a dot density of 50%. The second run completes the recording across the unit strip of recording field. Since each unit strip of recording field is divided into four sub-strips which are combined into two sets comprising two nonadjacent sub-strips, that is, a set comprising the first and third sub-strips, and a set comprising the second and fourth sub-strips, and during the first recording run, recording is made across one set of sub-strips, for example, the second and fourth sub-strips, and then, during the second run, across another set of sub-strips, that is, the first and third sub-strips, illusionary lines with a length equal to the width of a single sub-strip of recording field appear. However, in this embodiment, each unit strip of recording field is divided into four sub-strips, in other words, the width of each sub-strips is ¼ the width of a unit strip of recording field. Therefore, the interval of the illusionary line is small, or the cycle at which the illusionary lines appear is short.

Thus, according to this embodiment, it is possible to record an image which is affected by a far smaller number of the illusionary lines than an image recorded by a conventional multi-scan recording method, by reducing the cycle at which the illusionary lines appear.

In comparison, the above described first to fourth embodiments provide another effect in addition to the effect provided by the first embodiment. In other words, according to the preceding four embodiments, the intensity of the illusionary line can be reduced by effectively utilizing the effect that the ink in a dot formed by the ink droplet on recording medium is drawn by the ink in the priorly formed adjacent dots, and as a result, the illusionary lines are less apparent.

As described above, according to the present invention, a recording head used with a recording method in accedence with the present invention comprises a plurality of recording elements, which are aligned in the first direction, or the recording medium advancement direction, and are divided into a plurality of sets comprising nonadjacent sections, so that as the recording head is moved relative to a piece of recording medium in the second direction different from the first direction, recording is made across a set of the nonadjacent sub-strips separated by a predetermined interval, producing a plurality of strips of recorded fields with predetermined intervals which extend in the first direction. After each recording run by the recording head, the recording medium is advanced by such a distance so that the sub-strips of recording field left unrecorded through the preceding recording run are recorded through the following recording run, without overlapping. Therefore, the cycle at which the illusionary line appears between two adjacent sub-strips is small. As a result, the illusionary lines do not stand out.

Further, according to another aspect of the present invention, which relates to a multi-scan recording method, recording is made across each of the aforementioned sub-strips of recording field, which extend in the raster direction, through a plurality of recording runs made by the recording head while advancing the recording medium after each recording run, so that each sub-strip of recording field is recorded by two or more different recording elements. Therefore, the cycle at which the illusionary line appear can be made smaller by controlling the width, in the recording medium advancement direction, of each of sub-strips into which a unit strip of recording field is divided, and which are recorded through a single recording run by the recording head. Further, this aspect of the present invention produces the same effects as those produced by a conventional multi-scan recording method, in addition to the effect of controlling the ink drawing force, which is the main cause of the development of the illusionary lines. Thus, according to this aspect of the present invention, no only can the cycle at which the illusionary line appear be made smaller, making the illusionary lines less noticeable, but also, the development of the illusionary lines can be reduced, so that the presence of the illusionary lines becomes less noticeable, overall.

According to another aspect of the present invention, a dot density thinning mask is switched for each sub-strip of recording field, and also for each recording run, to prevent the problem that only a specific group of recording elements is used. Therefore, the service life of a recording head becomes longer.

According to another aspect of the present invention, whether or not there is a null raster is detected to switch the dot density thinning mask immediately after the null raster, so that the time spent for mask change is reduced, and also that the problem that only a specific group of recording elements are used is prevented. Therefore, the service life of a recording head becomes longer.

According to another aspect of the present invention, a plurality of recording elements used to record across the same sub-strip of recording field are selected from two adjacent sections of a recording head. Therefore, the problem which occurs when a recording head with a large number of recording elements is used along with a multi-scan recording method, that is, the ink droplet landing position error which creates abnormal texture, is prevented. Further, the problem that only a specific group of recording elements is used is prevented, Thus, the service life of a recording head becomes longer. In other words, a recording head enabled to record at a high speed can be used along with a multi-scan recording method without the above described well-known problem associated with the combined usage.

As described above, according to the present invention, it is possible to provide a multi-scan recording method and a high speed recording apparatus, which can be used in combination to produce a high quality image at a high speed.

In this specification, the present invention was described with reference to a printing apparatus which employed an ink jet recording system, in particular, a printing apparatus such as an ink jet recording system that comprises a means (for example, electrothermal transducer or laser) for generating thermal energy to be used as the energy for ejecting ink, and changes the state of the ink with the use of the thermal energy. This is because according to such a system, recording can be made at a high resolution and a high level of accuracy.

The typical structure and the operational principle are preferably the ones disclosed in U.S. Pat. Nos. 4,723,129 and 4,740,796. The principle and structure are applicable to a so-called on-demand type recording system and a continuous type recording system. Particularly, however, it is suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling paint, by which the thermal energy is provided by the electrothermal transducer to produce film boiling on the heating portion of the recording head, whereby a bubble can be formed in the liquid (ink) corresponding to each of the driving signals. By the production, development and contraction of the bubble, the liquid (ink) is ejected through an ejection outlet to produce at least one droplet. The driving signal is preferably in the form of a pulse, because the development and contraction of the bubble can be effected instantaneously, and therefore, the liquid (ink) is ejected with quick response.

The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disclosed at a bent portion, as well as the structure of the combination of the ejection outlet, liquid passage and the electrothermal transducer as disclosed in the above-mentioned patents. In addition, the present invention is applicable to the structure disclosed in Japanese Laid-Open Patent Application No. 123670/1984 wherein a common slit is used as the ejection outlet for plural electrothermal transducers, and to the structure disclosed in Japanese Laid-Open Patent Application No. 138461/1984 wherein an opening for absorbing pressure wave of the thermal energy is formed corresponding to the ejecting portion.

In addition, the present invention is applicable to a replaceable chip type recording head which is connected electrically with the main apparatus and can be supplied with the ink when it is mounted in the main assembly, or to a cartridge type recording head having an integral ink container.

The provision of the recovery means for a recording head and/or the auxiliary means for the preliminary operation are preferable, because they can further stabilize the effects of the present invention. As for such means, there are capping means for the recording head, cleaning means therefor, pressing or sucking means, preliminary heating means which may be the electrothermal transducer, an additional heating element or a combination thereof. Also, means for effecting preliminary ejection (not for the recording operation) can stabilize the recording operation.

Furthermore, in the foregoing embodiment, the ink has been liquid. It may be, however, an ink which is solidified below the room temperature but liquefied at the room temperature. In other words, any type of ink will suffice as long as it can be in the liquid state when a recording signal is applied to the ink.

In one of the inks, the temperature rise due to the thermal energy is positively prevented by consuming it for the state change of the ink from the solid state to the liquid state. Another ink is solidified when it is left, to prevent the evaporation of the ink. In either of the cases, the application of the recording signal producing thermal energy causes the ink to be liquefied so that the ink is ejected. Another ink may start to be solidified at the time when it reaches the recording material. The present invention is also applicable to such an ink as is liquefied by the application of the thermal energy. Such an ink may be retained in the liquid or solid state, in through holes or recesses formed in a porous sheet as disclosed in Japanese Laid-Open Patent Application No. 56847/1979 and Japanese Laid-Open Patent Application No. 71260/1985. The sheet is faced to the electrothermal transducers. The most effective system for the ink materials described above is the film boiling system.

While the invention has been described with reference to the structures disclosed herein, it is not confined to the details set forth and this application is intended to cover such modifications or changes as may come within the purposes of the improvements or the scope of the following claims.

What is claimed is:

1. An ink jet recording apparatus wherein recording is effected while a recording head having a plurality of recording elements arranged in a first direction is scanningly moved relative to a recording material in a second direction which is different from the first direction, said apparatus comprising:

scanning means for scanningly moving relative to the recording material in the second direction;

control means for controlling driving of said recording head such that with predetermined scanning movements, the recording is effected such that a first recording band region which extends in the second direction and which is recorded using a part of said recording elements and a second recording band region which is not recorded during the predetermined scanning movements, appear alternately, in the first direction and with other scanning movements different from the predetermined scanning movements carried out after completion of the recording for first the recording band region, the second recording band region is recorded, wherein the first recording band region and the second recording band region are composed of a plurality of lines extending in the second direction.

2. An ink jet recording method wherein recording is effected while a recording head having a plurality of recording elements arranged in a first direction is scanningly moved relative to a recording material in a second direction which is different from the first direction, said method comprising the steps of:

effecting recording with predetermined scanning movements, where the recording is effected such that a first recording band region which extends in the second direction and which is recorded using a part of the recording elements and a second recording band region which is not recorded during the predetermining scanning movements, appear alternately in the first direction; and effecting recording in the second recording band region with other scanning movements different from the predetermined scanning movements carried out after completion of the recording for the first recording band region, wherein the recording band region and the non-recording band region are composed of a plurality of lines extending in the second direction.

3. An ink jet recording apparatus wherein recording is effected while a recording head having a plurality of recording elements arranged in a first direction is scanningly moved relative to a recording material in a second direction which is different from the first direction, and wherein a predetermined recording region which is recordable by one relative scanning movement in the second direction is recorded by a plurality of scanning movements in accordance with a predetermined divided thinning mask, and a same scanning line in the predetermined recording region is recorded by different recording elements, said apparatus comprising:

means for dividing the predetermined recording region into a plurality of divided regions for a plurality of lines;

thinning mask setting means for setting the divided thinning mask for the divided region; and control means for effecting recording by a plurality of scanning operations on the plurality of divided recording regions using the divided thinning mask, so that the divided recording region not adjacent in the first direction are recorded by the same scanning operation, wherein after completion of recording of one group of the divided recording regions not adjacent in the first direction, said control means completes recording of another group of the divided recording regions not adjacent in the first direction.

4. An apparatus according to claim 3, wherein said setting means sets the divided thinning mask for each of the recording scanning operations.

5. An apparatus according to claim 3 or 4, further comprising detecting means for detecting a nul line, and said setting means sets the divided thinning mask depending on presence or absence of the nul line.

6. An apparatus according to claim 3 or 4, further comprising setting means for setting movement distance of the recording material, which sets it for each of the recording scanning operations.

7. An apparatus according to claim 3 or 4, wherein said recording elements include a thermal energy generating means.

8. An ink jet recording method wherein recording is effected while a recording head having a plurality of recording elements arranged in a first direction is scanningly moved relative to a recording material in a second direction which is different from the first direction, and wherein a predetermined recording region which is recordable by one relative scanning movement in the second direction is recorded by a plurality of scanning movements in accordance with a predetermined divided thinning mask, and a same scanning line in the predetermined recording region is recorded by different recording elements, said method comprising the steps of:

dividing the predetermined recording region into a plurality of divided regions for a plurality of lines;

setting the divided thinning mask for the divided region; and effecting recording by a plurality of scanning operations on the plurality of divided recording regions using the divided thinning mask, so that the divided recording region not adjacent in the first direction are recorded by the same scanning operation, wherein after completion of recording of one group of the divided recording regions not adjacent in the first direction, another group of the divided recording regions not adjacent in the first direction are recorded.

9. An apparatus according to claim 8, wherein said setting means sets the divided thinning mask for each of the recording scanning operations.

10. An apparatus according to claim 8 or 9, further comprising detecting means for detecting a nul line, and said setting means sets the divided thinning mask depending on presence or absence of the nul line.

11. An apparatus according to claim 8 or 9, further comprising setting means for setting movement distance of the recording material, which sets it for each of the recording scanning operations.

12. An apparatus according to claim 8 or 9, wherein said recording elements include a thermal energy generating means.

* * * * *

UNITED STATES PATENT AND TRADEMARK OFFICE
CERTIFICATE OF CORRECTION

PATENT NO. : 6,527,364 B2
DATED : March 4, 2003
INVENTOR(S) : Kiichiro Takahashi It is certified that error appears in the above-identified patent and that said Letters Patent is hereby corrected as shown below:

<u>Column 3,</u>
Line 65, "density" should read -- density. --.

<u>Column 5,</u>
Line 2, "loin" should read -- in --; and
Line 26, "comprises:" should read -- comprising: --.

<u>Column 7,</u>
Line 62, "Jet cartridge" should read -- jet cartridge --.

<u>Column 8,</u>
Line 21, "head" should read -- head. --.

<u>Column 9,</u>
Line 11, "makes It" should read -- makes it --.

<u>Column 17,</u>
Line 46, "element" should read -- elements --.

<u>Column 18,</u>
Line 32, "advance" should read -- advanced --; and
Line 34, "advance" should read -- advance. --.

<u>Column 20,</u>
Line 3, "sub-strips" should read -- sub-strip --; and
Line 58, "no" should read -- not --.

UNITED STATES PATENT AND TRADEMARK OFFICE
CERTIFICATE OF CORRECTION

PATENT NO.    : 6,527,364 B2
DATED         : March 4, 2003
INVENTOR(S)   : Kiichiro Takahashi It is certified that error appears in the above-identified patent and that said Letters Patent is hereby corrected as shown below:

<u>Column 21,</u>
Line 49, "paint," should read -- point, --.

Signed and Sealed this

Fourteenth Day of October, 2003

JAMES E. ROGAN
*Director of the United States Patent and Trademark Office*